United States Patent
Masuko

(10) Patent No.: US 9,396,392 B2
(45) Date of Patent: Jul. 19, 2016

(54) SERVER, SERVER CONTROL METHOD, PROGRAM AND RECORDING MEDIUM

(75) Inventor: Soh Masuko, Tokyo (JP)

(73) Assignee: Rakuten, Inc., Tokyo (JP)

( * ) Notice: Subject to any disclaimer, the term of this patent is extended or adjusted under 35 U.S.C. 154(b) by 297 days.

(21) Appl. No.: 14/114,047

(22) PCT Filed: Apr. 26, 2012

(86) PCT No.: PCT/JP2012/061186
§ 371 (c)(1),
(2), (4) Date: Nov. 11, 2013

(87) PCT Pub. No.: WO2012/147839
PCT Pub. Date: Nov. 1, 2012

(65) Prior Publication Data
US 2014/0056525 A1   Feb. 27, 2014

(30) Foreign Application Priority Data
Apr. 28, 2011   (JP) .................................. 2011-101534

(51) Int. Cl.
| | | |
|---|---|---|
| G06K 9/46 | (2006.01) | |
| G06K 9/00 | (2006.01) | |
| G06F 3/0484 | (2013.01) | |
| G06F 17/28 | (2006.01) | |
| G06K 9/22 | (2006.01) | |
| G06F 17/30 | (2006.01) | |

(52) U.S. Cl.
CPC ........ *G06K 9/00523* (2013.01); *G06F 3/04842* (2013.01); *G06F 17/289* (2013.01); *G06F 17/30905* (2013.01); *G06K 9/228* (2013.01); *G06K 2209/01* (2013.01)

(58) Field of Classification Search
CPC .. G06F 3/04842; G06F 17/28; G06K 9/00523
See application file for complete search history.

(56) References Cited

U.S. PATENT DOCUMENTS

| | | | |
|---|---|---|---|
| 5,761,655 A | 6/1998 | Hoffman | |
| 7,197,450 B2 * | 3/2007 | Shimamura | G06F 17/2836 704/10 |

(Continued)

FOREIGN PATENT DOCUMENTS

| | | | |
|---|---|---|---|
| EP | 1 130 523 A2 | 5/2001 | |
| EP | 2 587 388 A1 | 5/2013 | |

(Continued)

*Primary Examiner* — Gregory M Desire
(74) *Attorney, Agent, or Firm* — Sughrue Mion, PLLC

(57) ABSTRACT

A request receiver (101) receives a request in which image ID information and a parameter for image processing are specified, from a terminal. An image processor (102) acquires an image based on the ID information that was specified in the received request, and by using the parameter that was specified in the received request to apply the image processing on the acquired image, outputs extracted information that was extracted from inside the image. A response transmitter (103) transmits a response in which the extracted information that was outputted by the image processor (102) is specified, to the terminal. When the extracted information that is associated with the ID information and the parameter that were specified in the received request is cached, the image processor (102), instead of acquiring the image and applying the image processing, obtains the cached extracted information, and outputs the obtained extracted information.

14 Claims, 28 Drawing Sheets

(56) References Cited

U.S. PATENT DOCUMENTS

| | | | | |
|---|---|---|---|---|
| 7,216,072 | B2* | 5/2007 | Kasai | G06F 17/28 |
| | | | | 704/2 |
| 2001/0018649 | A1 | 8/2001 | Kasai et al. | |
| 2003/0115552 | A1 | 6/2003 | Jahnke et al. | |
| 2004/0260535 | A1 | 12/2004 | Chen et al. | |
| 2005/0221856 | A1 | 10/2005 | Hirano et al. | |
| 2006/0135137 | A1* | 6/2006 | Chung | H04M 1/27 |
| | | | | 455/415 |
| 2008/0137958 | A1 | 6/2008 | Wang et al. | |
| 2008/0243819 | A1 | 10/2008 | Sareen et al. | |
| 2012/0140251 | A1* | 6/2012 | Grodsky | G06F 3/1206 |
| | | | | 358/1.9 |
| 2014/0056525 | A1* | 2/2014 | Masuko | G06F 3/04842 |
| | | | | 382/190 |

FOREIGN PATENT DOCUMENTS

| | | | |
|---|---|---|---|
| JP | 10312381 | A | 11/1998 |
| JP | 2000330992 | A | 11/2000 |
| JP | 2000332984 | A | 11/2000 |
| JP | 2001-318919 | A | 11/2001 |
| JP | 2003-122751 | A | 4/2003 |
| JP | 2007079978 | A | 3/2007 |
| JP | 4658236 | B1 | 3/2011 |
| TW | 200825855 | A | 6/2008 |
| TW | 200846953 | A | 12/2008 |

* cited by examiner

EXTRACTED INFORMATION TABLE 101a

| ID INFORMATION (IMAGE URL) | PARAMETER | EXTRACTED INFORMATION |
| --- | --- | --- |
| | LANGUAGE FOR RECOGNITION | RECOGNIZED CHARACTER STRING |
| http://xxx.601.jpg | ENGLISH | *Sale*<br>*Water*<br>*Best bang for the buck* |
| : | : | : |

101a1, 101a2, 101a3

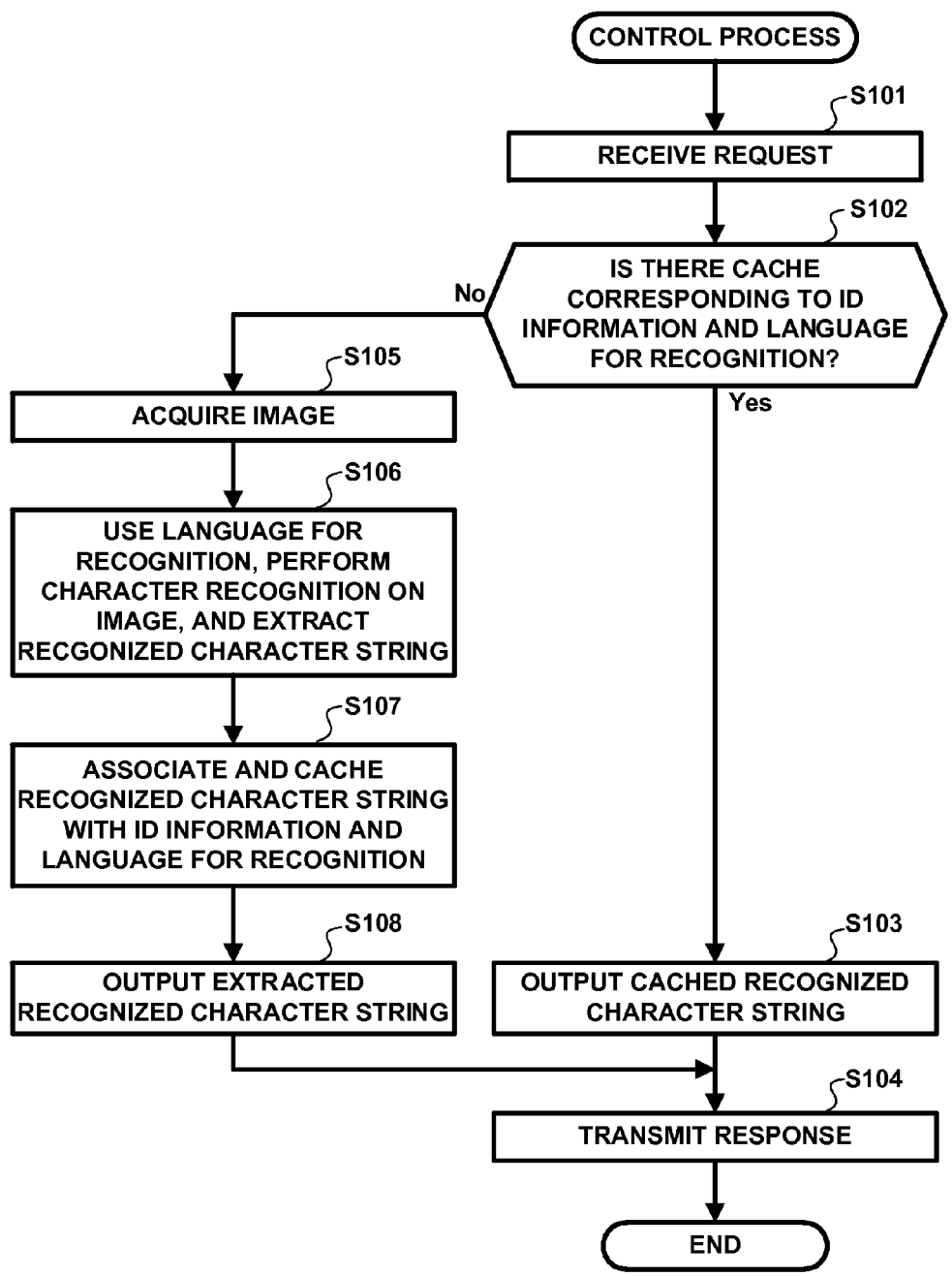

FIG. 10

EXTRACTED INFORMATION TABLE 101a

| ID INFORMATION (IMAGE URL) 101a1 | PARAMETER 101a2 | | EXTRACTED INFORMATION 101a3 |
|---|---|---|---|
| | LANGUAGE FOR RECOGNITION | SPECIFIED AREA | RECOGNIZED CHARACTER STRING |
| http://xxx.601.jpg | ENGLISH | (5,100):(48,200) | *Sale* |
| http://xxx.601.jpg | ENGLISH | (52,-20):(98,320) | *Water* |
| http://xxx.601.jpg | ENGLISH | (85,15):(210,285) | *Best bang for the buck* |
| ⋮ | ⋮ | ⋮ | ⋮ |

FIG. 12

EXTRACTED INFORMATION TABLE 101a

| IMAGE ID INFORMATION (101a1) | PARAMETER (101a2) | | EXTRACTED INFORMATION (101a3) |
|---|---|---|---|
| | LANGUAGE FOR RECOGNITION | SPECIFIED AREA (RECOGNIZED AREA) | RECOGNIZED CHARACTER STRING |
| http://xxx.601.jpg | ENGLISH | (8,110):(45,170) | *Sale* |
| http://xxx.601.jpg | ENGLISH | (60,120):(90,180) | *Water* |
| http://xxx.601.jpg | ENGLISH | (110,25):(190,270) | *Best bang for the buck* |
| : | : | : | : |

FIG. 16

EXTRACTED INFORMATION TABLE 101a

| IMAGE ID INFORMATION | PARAMETER | | | EXTRACTED INFORMATION | |
|---|---|---|---|---|---|
| | LANGUAGE FOR RECOGNITION | SPECIFIED AREA (RECOGNIZED AREA) | CONVERSION INFORMATION (TRANSLATION TARGET LANGUAGE) | RECOGNIZED CHARACTER STRING | CONVERTED CHARACTER STRING |
| http://xxx.601.jpg | ENGLISH | (110,25):(190,270) | JAPANESE | *Best bang for the buck* | お買い得 |
| .. | .. | .. | SPANISH | .. | Ganga buena |
| .. | | | | | .. |

FIG. 24

EXTRACTED INFORMATION TABLE 101a

| IMAGE ID INFORMATION | PARAMETER | | | EXTRACTED INFORMATION | |
|---|---|---|---|---|---|
| | LANGUAGE FOR RECOGNITION | SPECIFIED AREA (RECOGNIZED INFORMATION) | CONVERSION INFORMATION (TRANSLATION TARGET LANGUAGE) | RECOGNIZED CHARACTER STRING | CONVERTED CHARACTER STRING |
| http://xxx.601.jpg | ENGLISH | (60,120):(90,180) | JAPANESE | *Water* | 水 |
| | | | SPANISH | | Agua |
| | | | FRENCH | | L'eau |
| .. | .. | .. | .. | | - |

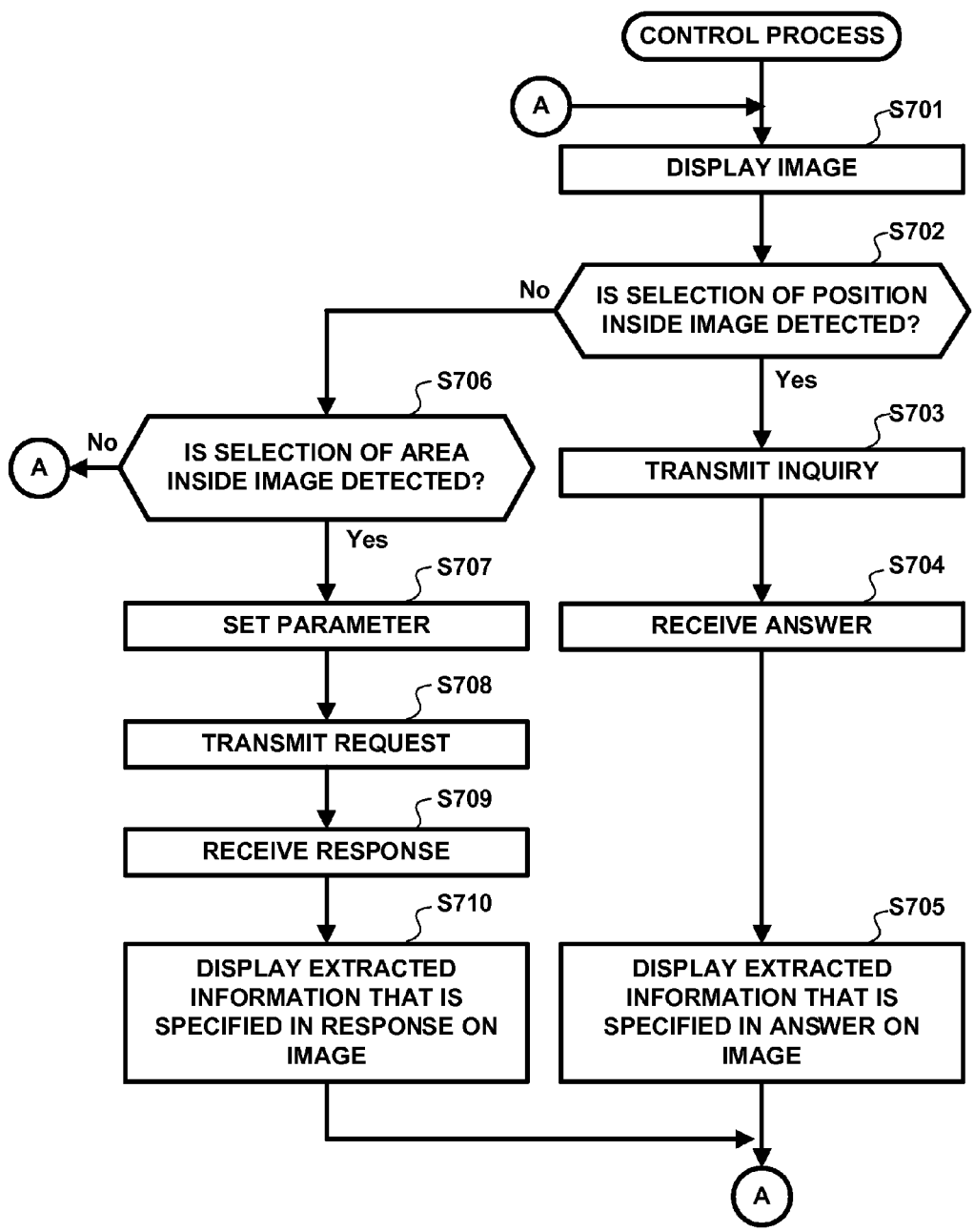

SERVER, SERVER CONTROL METHOD, PROGRAM AND RECORDING MEDIUM

TECHNICAL FIELD

The present invention relates to a server, a server control method, a program and a recording medium, and particularly, relates to the translation of character strings inside an image.

BACKGROUND ART

Conventionally, various translation tools have been known; however, there is a need for translation of WEB pages that have images in which character strings are included using those translation tools. In order to translate character strings that are included in an image, first it is necessary to perform character recognition of characters that are included in an image. Then, after the characters have been identified by character recognition, those characters are translated into the target language. However, the character recognition processing requires a certain amount of time, so that there was a problem in that translation in real-time was difficult. Various methods have been proposed to deal with this kind of problem. For example, Patent Literature 1 discloses a machine translation system that associates and stores images that include characters with character strings for translation, and when translating an image that includes characters, provides a translation result of the character string.

CITATION LIST

Patent Literature

Patent Literature 1: Japanese Patent No. 4658236

SUMMARY OF INVENTION

Technical Problem

There is also a desire to translate characters in an image as is without preparing character strings for translation.

The objective of the present invention is to solve a problem such as described above by providing a server, a server control method, a program and a recording medium that are suitable for translating characters of images in a WEB page in real-time.

Solution to Problem

A server according to a first aspect of the present invention, has a request receiver that receives a request in which image ID information and a parameter for image processing are specified, from a terminal;

an image processor that acquires an image based on the ID information that was specified in the received request, and by using the parameter that was specified in the received request to apply the image processing on the acquired image, outputs extracted information that was extracted from inside the image; and a response transmitter that transmits a response in which the extracted information that was outputted by the image processor is specified, to the terminal; wherein after the extracted information has been extracted, the image processor associates and caches the extracted information with the image ID information and the parameter; and when the extracted information that is associated with the ID information and the parameter that were specified in the received request is cached, the image processor, instead of acquiring the image and applying the image processing, obtains the cached extracted information, and outputs the obtained extracted information.

In the server according to the aspect above, the parameter that is specified in the request includes a specified area;

the image processing by the image processor includes extraction processing that, by performing character recognition on the specified area inside the image that is included in the parameter, outputs a recognized character string that was recognized from the specified area in the image;

after the recognized character string has been extracted, the image processor associates and caches the recognized character string with the image ID information and the specified area;

when a recognized character string that is associated with the ID information and the specified area included in the parameter that are specified in the received request is cached, the image processor, instead of the character recognition, obtains the cached recognized character string, and outputs that obtained recognized character string; and the extracted information includes the recognized character string.

Moreover, in the server according to the aspect above, when the ID information that was associated when the recognized character string was cached matches the ID information that was specified in the received request, and the specified area that was associated when the recognized character string was cached overlaps the specified area that is included in the parameter that was specified in the received request, the image processor determines that the extracted information that is associated with the ID information and the specified area included in the parameter that were specified in the received request is cached.

Furthermore, in the server according to the aspect above, when the recognized character string is extracted, the image processor caches the recognized character string after correcting the specified area to a recognized area in the specified area where the recognized character string was recognized.

In the server according to the aspect above, the parameter that is specified in the request includes a language for recognition; and the character recognition by the image processor is performed using the language for recognition.

Moreover, in the server according to the aspect above, the parameter that is specified in the request includes conversion information;

the image processing by the image processor includes conversion processing that, by performing a conversion processing on the outputted recognized character string using the conversion information that is included in the parameter that was specified in the received request, outputs a converted character string that is converted from the recognized character string; and the extracted information includes the converted character string.

Furthermore, in the server according to the aspect above, when the converted character string is extracted, the image processor associates and caches the converted character string with the image ID information, the specified area, the language for recognition, the recognized character string, and the conversion information; and when the converted character string is cached for the ID information, the specified area, the language for recognition and the conversion information that were specified in the received request, the image processor, instead of the conversion processing, obtains the cached converted character string, and outputs the obtained converted character string.

In the server according to the aspect above, the conversion processing obtains the converted character string by translating the recognized character string to a translation target language that is specified in the conversion information.

Moreover, the server according to the aspect above, further has an inquiry receiver that receives an inquiry in which image ID information is specified, from the terminal; and an answer transmitter that, when the extracted information that is associated with the ID information that is specified in the received inquiry is not cached, transmits an answer in which a message is specified that prompts transmission of the request in which the image ID information and the parameter for image processing are specified, to the terminal and when the extracted information that is associated with the ID information that is specified in the received inquiry is cached, transmits an answer in which the extracted information is specified, to the terminal.

Furthermore, the server according to the aspect above, further has:

an inquiry receiver that receives an inquiry in which the image ID information and a position inside that image are specified, from the terminal; and an answer transmitter that, when a recognized character string that is associated with the ID information that is specified in the received inquiry and a specified area that includes the position that is specified in the received inquiry is cached by the image processor, transmits an answer in which the cached recognized character string is specified, to the terminal.

The server according to the aspect above, further has:

an inquiry receiver that receives an inquiry in which image ID information, a position inside the image and the conversion information are specified, from the terminal; and an answer transmitter that, when the converted character string that is associated with the ID information that is specified in the received inquiry, the conversion information, and the specified area that includes the position specified in the received inquiry is cached by the image processor, transmits an answer in which the cached converted character string is specified, to the terminal.

A program according to a second aspect of the present invention is a program that is executed by a computer that has a display that displays an image identified by the ID information on a screen and that is capable of communicating with the server according to the aspect above, and causes the computer to function as:

a position detector that detects a selection of a position inside the image that is displayed on the screen;

an inquiry transmitter that, when the selection of the position is detected, transmits an inquiry in which the ID information and the selected position are specified, to the server; and an answer receiver that receives an answer from the server;

the program causes the computer to function such that the display further displays on the screen the extracted information that is specified in the received answer;

the program causes the computer to function as:

an area detector that detects a selection of an area inside the image that is displayed on the screen;

a setter that prompts setting the parameter for image processing;

a request transmitter that, when the selection of the area is detected, transmits a request in which the ID information, the set parameter, and the selected area are specified, to the server; and a response receiver that receives a response from the server; and the program causes the computer to function such that the display further displays on the screen the extracted information that is specified in the received response.

A control method for a server according to a third aspect of the present invention, has:

a request receiving step for receiving a request in which image ID information and a parameter for image processing are specified, from a terminal;

an image processing step for acquiring an image based on the ID information that was specified in the received request, and by using the parameter that was specified in the received request to apply the image processing on the acquired image, outputting extracted information that was extracted from inside the image;

a response transmission step for transmitting a response in which the extracted information that was outputted is specified, to the terminal; wherein the image processing step includes, after the extracted information has been extracted, associating and caching the extracted information with the image ID information and the parameter; and when the extracted information that is associated with the ID information and the parameter that were specified in the received request is cached, instead of acquiring the image and applying the image processing, obtaining the cached extracted information, and outputting the obtained extracted information.

A program according to a fourth aspect of the present invention causes a computer to function as:

a request receiver that receives a request in which image ID information and a parameter for image processing are specified, from a terminal;

an image processor that acquires an image based on the ID information that was specified in the received request, and by using the parameter that was specified in the received request to apply the image processing on the acquired image, outputs extracted information that was extracted from inside the image; and a response transmitter that transmits a response in which the extracted information that was outputted by the image processor is specified, to the terminal; wherein after the extracted information has been extracted, the image processor associates and caches the extracted information with the image ID information and the parameter; and when extracted information that is associated with the ID information and the parameter that were specified in the received request is cached, the image processor, instead of acquiring the image and applying the image processing, obtains the cached extracted information, and outputs the obtained extracted information.

A recording medium according to a fifth aspect of the present invention readable by a computer and records a program that causes the computer to function as:

a request receiver that receives a request in which image ID information and a parameter for image processing are specified, from a terminal;

an image processor that acquires an image based on the ID information that was specified in the received request, and by using the parameter that was specified in the received request to apply the image processing on the acquired image, outputs extracted information that was extracted from inside the image; and a response transmitter that transmits a response in which the extracted information that was outputted by the image processor is specified, to the terminal; wherein after the extracted information has been extracted, the image processor associates and caches the extracted information with the image ID information and the parameter; and when the extracted information that is correlated with the ID information and the parameter that were specified in the received request is cached, the image processor, instead of acquiring the image and applying the image processing, obtains the cached extracted information, and outputs the obtained extracted information.

The program above can be distributed and sold by way of a computer communication network independent from the computer that executes the program. Moreover, the recording medium above can be distributed and sold independent from the computer.

Here, a non-transitory recording medium is a tangible recording medium. A non-transitory recording medium is, for example, a compact disk, a flexible disk, a hard disk, a magneto-optical disk, a digital video disk, a magnetic tape, a semiconductor memory and the like. Moreover, a transitory recording medium is the transmission medium (propagation signal) itself. A transitory recording medium, for example, is an electric signal, an optical signal, an electromagnetic waves and the like. A temporary memory area is an area for temporarily storing data and programs, and is, for example, a volatile memory such as RAM (Random Access Memory).

Advantageous Effects of Invention

With the present invention it is possible to provide a server, a server control method, a program and a recording medium that are suitable for translating characters in an image on a WEB page in real-time.

BRIEF DESCRIPTION OF DRAWINGS

FIG. 6 is a drawing for explaining an extracted information table;

FIG. 8 is a flowchart for explaining the control process performed by each part of the server of the first embodiment;

FIG. 10 is a drawing for explaining an extracted information table;

FIG. 12 is a drawing for explaining an extracted information table;

FIG. 16 is a drawing for explaining an extracted information table;

FIG. 24 is a drawing for explaining an extracted information table;

FIG. 28 is a flowchart for explaining the control process that is performed by each part of the terminal of the seventh embodiment.

DESCRIPTION OF EMBODIMENTS

Figure 1:
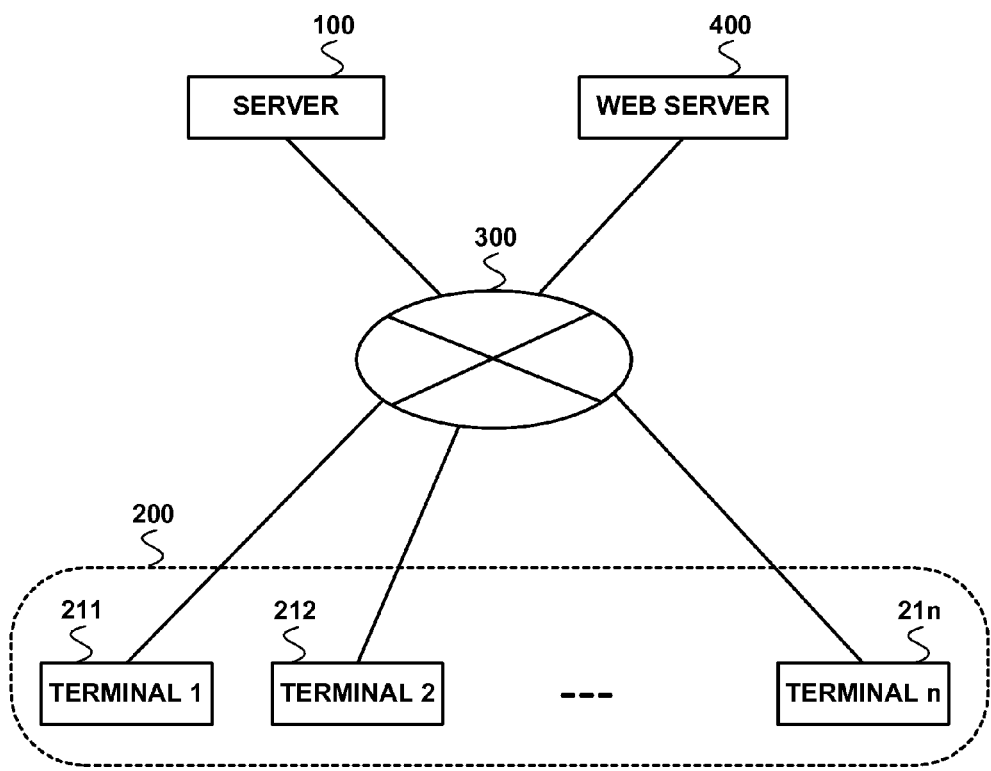
FIG. 1 is a drawing illustrating the relationship among a server, a WEB server, and a terminal of embodiments of the present invention.

As illustrated in FIG. 1, a server 100 of embodiments of the present invention is connected to a Internet 300. Plural terminals 211, 212 to 21n (hereafter, these will collectively be called "terminal 200") that are operated by users and a WEB server 400 are connected to the Internet 300. The WEB server 400 provides a specified WEB page to the terminal 200 according to a request from the terminal 200. The server 100 then performs translation of the WEB page according to a request from the terminal 200, and provides the translation result to the terminal 200. In the embodiments that will be described later, the server 100 and the WEB server 400 are connected by way of the Internet 300 as illustrated in FIG. 1; however, this is only an example. For example, it is possible for the server 100 and the WEB server 400 to be achieved by the same device. Alternatively, the server 100 and the WEB server 400 can also be connected directly.

In the following, a typical information processing device 500 by which the server 100 or the terminal 200 of the embodiments of the present invention is achieved will be explained.

(1. Basic Construction of an Information Processing Device)

Figure 2:
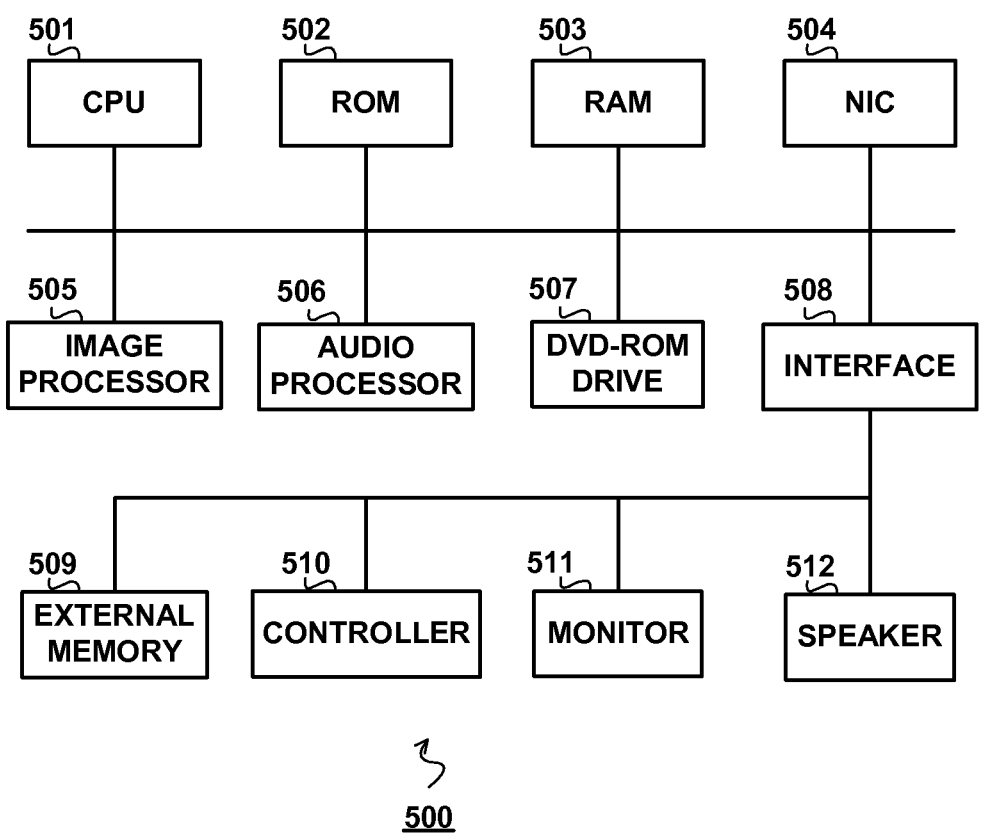
FIG. 2 is a drawing illustrating the basic construction of a typical information processing device by which the server or the terminal of the embodiments of the present invention is achieved.

As illustrated in FIG. 2, the information processing device 500 has a CPU (Central Processing Unit) 501, a ROM (Read Only Memory) 502, a RAM 503, an NIC (Network Interface Card) 504, an image processor 505, an audio processor 506, a DVD-ROM (Digital Versatile Disc ROM) drive 507, an interface 508, an external memory 509, a controller 510, a monitor 511 and a speaker 512.

The CPU 501 controls the overall operation of the information processing device 500, and exchanges control signals and data with each of the connected component elements.

The ROM 502 stores an IPL (Initial Program Loader) that is executed immediately after the power has been turned ON, and by executing this IPL, a specified program is read to the RAM 503, and the CPU 501 starts execution of that program. The ROM 502 also stores an operating system program and various data that are necessary for controlling the overall operation of the information processing device 500.

The RAM 503 is for temporarily storing data and programs, and stores programs and data that are read from a DVD-ROM, as well as data that is necessary for communication.

The NIC 504 is for connecting the information processing device 500 to a computer network such as the Internet 300, and has an interface (not illustrated in the figure) for acting as a go-between for devices such as a device according to the 10 BASE-T/100 BASE-T standard that is used when creating a LAN (Local Area Network), an analog modem, an ISDN (Integrated Services Digital Network) modem, an ADSL (Asymmetric Digital Subscriber Line) modem for connecting to the Internet using an telephone line, a cable modem for connecting to the Internet using a cable television line, and the like, and the CPU 501.

After processing data that is read from a DVD-ROM or the like by the CPU 501 or an image computation processor (not illustrated in the figure) of the image processor 505, the image processor 505 stores the result in a frame memory (not illustrated in the figure) of the image processor 505. The image information that is stored in the frame memory is converted to a video signal at specified synchronization timing, and outputted to the monitor 511. As a result, various pages become possible to be displayed.

The audio processor 506 converts audio data that is read from a DVD-ROM or the like to an analog audio signal, and causes that audio signal to be outputted from the connected speaker 512. Moreover, under the control of the CPU 501, the audio processor 506 creates sounds that are supposed to be generated during processing by the information processing device 500, and causes corresponding audio to be outputted from the speaker 512.

A program for achieving, for example, the server 100 of the embodiments, is recorded on a DVD-ROM that is mounted in the DVD-ROM drive 507. Under control of the CPU 501, the DVD-ROM drive 507 performs processing to read the mounted DVD-ROM, reads the necessary program and data, and temporarily stores those in the RAM 503 or the like.

The external memory 509, the controller 510, the monitor 511 and the speaker 512 are connected to the interface 508 so as to be removable.

The external memory 509 stores data related to personal information of the user and the like so as to be rewritable.

The controller 510 receives operation input that is performed such as when performing various settings for the information processing device 500. By inputting instructions by way of the controller 510, the user of the information processing device 500 is able to store the data in a suitable external memory 509.

The monitor 511 provides the user of the information processing device 500 with data that is outputted from the image processor 505.

The speaker 512 provides the user of the information processing device 500 with audio data that is outputted from the audio processor 506.

In addition, the information processing device 500 is potentially constructed so as to be able to use a large-capacity external storage device such as a hard disk and the like in order to achieve the same functions as the ROM 502, the RAM 503, the external memory 509, a DVD-ROM that is mounted in the DVD-ROM drive 507 and the like.

In the following, the server 100 or the terminal 200 of the embodiments that are achieved by the information processing device 500 above will be explained with reference to FIG. 1 to FIG. 28. By turning ON the power to the information processing device 500, the program that causes the information processing device 500 to function as the server 100 or terminal 200 of the embodiments is executed, and the server 100 or terminal 200 is achieved.

Figure 3:
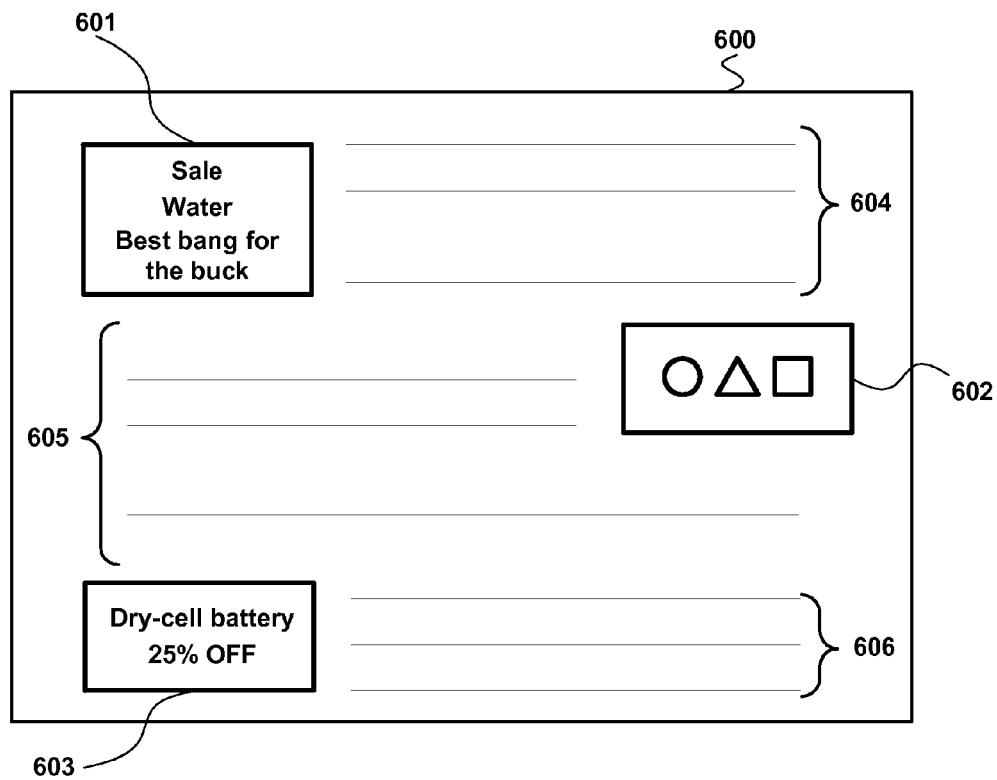
FIG. 3 is a drawing for explaining an example of a WEB page that is displayed by a terminal.

FIG. 3 illustrates an example of a WEB page that is provided to the terminal 200 by the WEB server 400 in the embodiments below. The WEB page 600 includes images 601, 602 and 603 and texts 604, 605 and 606. The images 601 and 603 are images that include text, and the image 602 is an image that does not include text. Moreover, the image URLs of the image 601, 602 and 603 are taken to be "http://xxx.601.jpg", "http://xxx.602.jpg" and "http://xxx.603.jpg".

(2. Basic Construction of a Server of a First Embodiment)

When character recognition has already been performed for an image when translating a character string that is included in the image, a server 100 of a first embodiment is able to omit the processing for acquiring the image and performing the character recognition.

Figure 4:
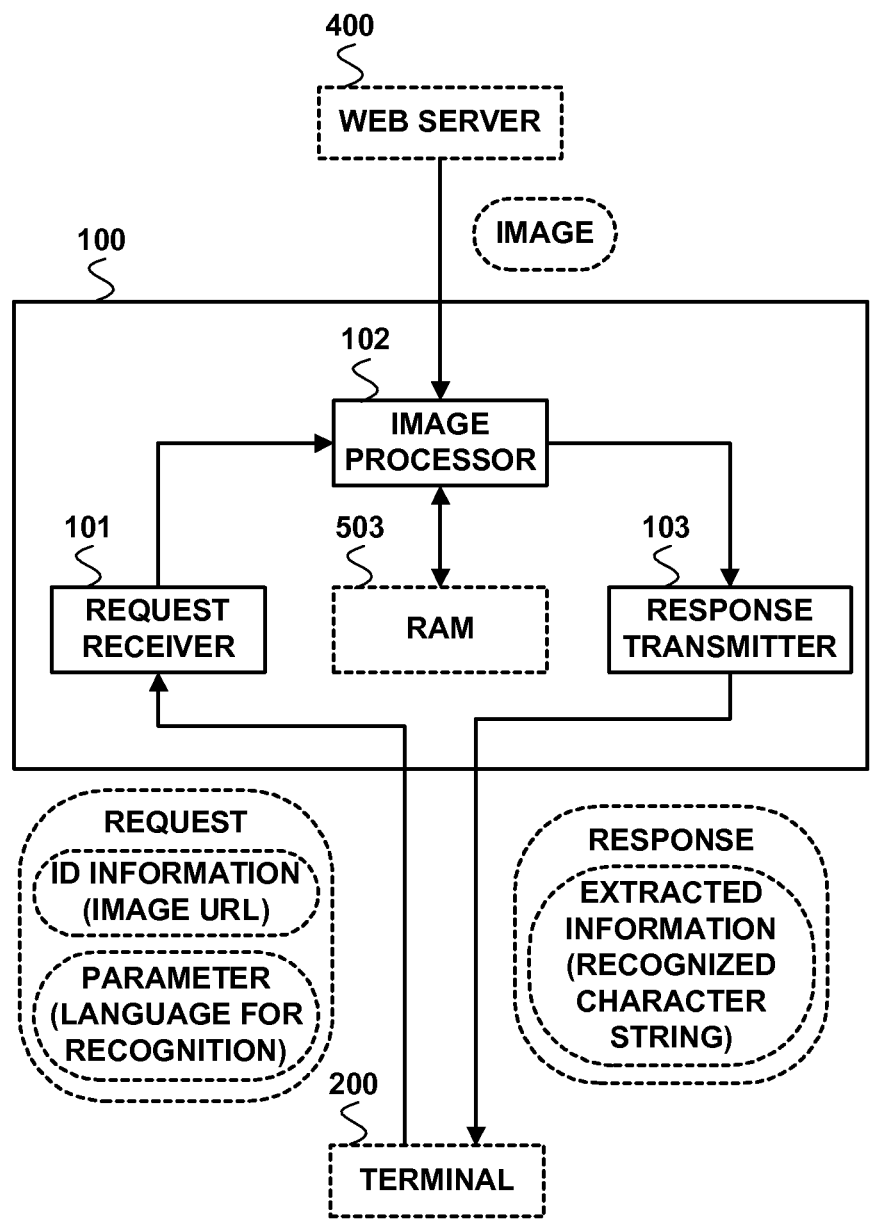
FIG. 4 is a drawing for explaining the basic construction of a server of a first embodiment.

As illustrated in FIG. 4, the server 100 of this embodiment has a request receiver 101, an image processor 102, and a response transmitter 103.

The request receiver 101 receives a request, in which image ID information and a parameter for image processing are specified, from the terminal 200.

The image ID information, for example, is an image URL. Moreover, image processing, for example, is a character recognition processing for recognizing characters inside an image. A parameter for image processing, for example, is a language for recognition that indicates which language the characters inside an image are in. Character recognition is performed for the characters inside the image presumed to be in the specified language for recognition.

Figure 5A:
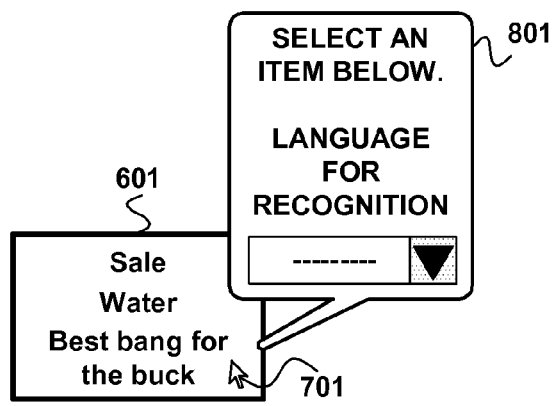
FIGS. 5A to 5C are drawings for explaining examples of an image on the WEB page.
Figure 5B:
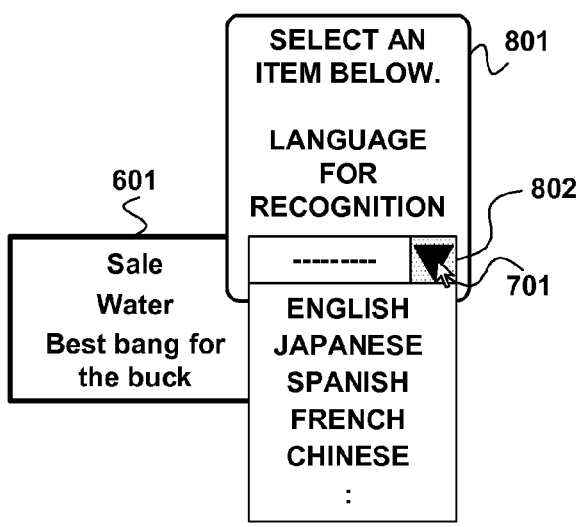
Figure 5C:
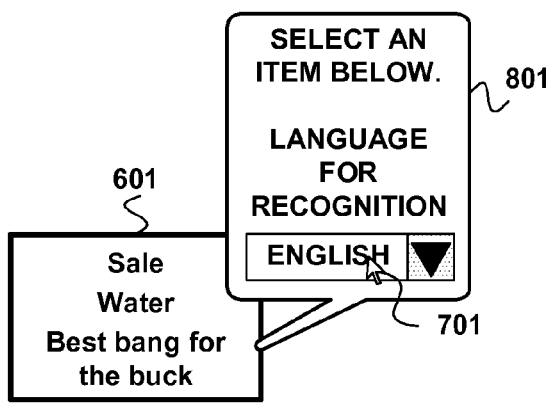

In the following, an example is explained for the case in which a user requests translation of the image 601 of the WEB page 600 from the server 100. For example, when a user places a cursor 701 (mouse over) over the image 601 that is displayed on the terminal 200, a pop up 801, requesting that the language for recognition be specified, is displayed as illustrated in FIG. 5A. As illustrated in FIG. 5B, when a user clicks on a button 802 with the cursor 701, a pull-down menu is displayed. The user then selects the language (language for recognition) of the character string inside the image 601 from the menu. As illustrated in FIG. 5C, when "English" is specified as the language for recognition, a request, in which the image URL "http://xxx.601.jpg" of the image 601 and the language for recognition "English" are specified, is transmitted to the server 100. The request receiver 101 of the server 100 receives that request.

In this embodiment, the CPU 501 and the NIC 504 work together to function as the request receiver 101. The same is true for the following second through sixth embodiments.

The image processor 102 acquires an image based on the ID information that is specified in the received request, and by applying image processing using the parameter that is specified in the received request, outputs an extracted information that was extracted from inside the image.

Here, the extracted information, for example, is the character recognition result, which is a character string inside the obtained image (in the following, this will be called the "recognized character string"). For example, when a request that specifies the image URL "http://xxx.601.jpg" and the language for recognition "English" is received, the image processor 102 first acquires the image 601 from the WEB server 400 based on that image URL. The image processor 102 performs character recognition presuming the language of the characters included in the acquired image 601 to be English. As a result of character recognition, it is determined that the characters inside the image 601 are "Sale Water Best bang for the buck", and then the image processor 102 outputs these character strings as recognized character strings that were extracted from inside the image 601.

Moreover, after the extracted information has been extracted, the image processor 102 associates and caches that extracted information with the image ID information and the parameter.

For example, an extracted information table 101a such as illustrated in FIG. 6 is stored in the RAM 503. In the extracted information table 101a, image ID information (image URLs) 101a1, parameters (languages for recognition) 101a2, extracted information (recognized character strings) 101a3 are associated and registered. The image processor 102, by using character recognition, obtains the recognized character string "Sale Water Best bang for the buck", and then associates and registers that recognized character string and the image URL of the image 601 "http://xxx.601.jpg" with the language for recognition "English" in the extracted information table 101a.

In this embodiment, the CPU 501 and the image processor 505 work together to function as the image processor 102. The same is true in the second through sixth embodiments below as well.

The response transmitter 103 transmits a response in which the extracted information that was outputted by the image processor 102 is specified to the terminal 200.

Figure 7:
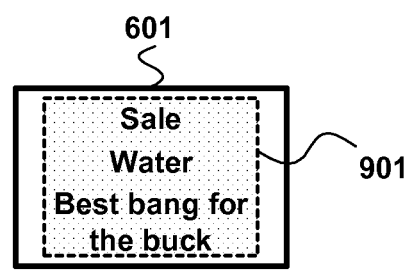
FIG. 7 is a drawing for explaining an example of the image on the WEB page.

For example, the response transmitter 103 transmits a response in which the recognized character string "Sale Water Best bang for the buck" is specified to the terminal 200. Here, that response, for example, also includes a command to add a tag for overlaying and displaying an arbitrary shape to the image in the WEB page that is displayed on the terminal 200 for which character recognition is completed. For example, as illustrated in FIG. 7, after the terminal 200 receives that response, a semi-transparent rectangle 901 is overlaid and displayed on the image 601 for which character recognition is complete.

In this embodiment, the CPU 501 and the NIC 504 work together to function as the response transmitter 103. The same is also true for the second through sixth embodiments below.

When the extracted information that is associated with the ID information and parameter that are specified in the received request is cached, the image processor 102, instead of acquiring an image and applying image processing, obtains the cached extracted information, and outputs that obtained extracted information.

For example, the request receiver 101 receives a request, in which the image URL of the image 601 and the language for recognition "English" are specified, and the image processor 102 references the extracted information table 101a in FIG. 6.

The recognized character string "Sale Water Best bang for the buck" that corresponds to the ID information of the image 601 and the language for recognition "English" is registered, so that the image processor 102 omits the process for obtaining the image 601 and performing character recognition, and outputs that recognized character string to the response transmitter 103.

(3. Operation of the Server of the First Embodiment)

Next, the flowchart in FIG. 8 will be used to explain the operations that are performed by all of the parts of the server 100 of this embodiment. After the power has been turned ON to the server 100, the CPU 501 starts the control process that is illustrated in the flowchart in FIG. 8.

The request receiver 101 receives the request, in which the image ID information (image URL) and the parameter (language for recognition) for image processing are specified, from the terminal 200 (step S101). For example, when the user places the cursor 701 over the image 601 and specifies the language for recognition "English" by following the procedure illustrated in FIGS. 5A to 5C, the request receiver 101 receives the request in which the image URL "http://xxx.601.jpg" and the language for recognition "English" are specified.

The image processor 102 then determines whether or not the extracted information (recognized character string) that is associated with the ID information and the language for recognition that are specified in the received request are cached (step S102).

When it is determined that the recognized character string is cached (step S102; YES), the image processor 102 outputs the recognized character string that is cached (step S103). For example, when the extracted information table 101a illustrated in FIG. 6 is stored in the RAM 503, the image processor 102 outputs the recognized character string "Sale Water Best bang for the buck" that is associated with the image URL "http://xxx.601.jpg" and the language for recognition "English" to the response transmitter 103.

On the other hand, when it is determined that the recognized character string is not cached (step S102; NO), the image processor 102 acquires the image of the image URL that is specified in the received request (step S105). For example, when information about the recognized character string that is associated with the image URL "http://xxx.601.jpg" and the language for recognition "English" is not registered in the extracted information table 101a, the image processor 102 accesses the WEB server 400 and acquires the image 601 that corresponds to the image URL "http://xxx.601.jpg".

After acquiring the image, the image processor 102 then performs character recognition using the language for recognition that was specified in the request, and extracts a character string (recognized character string) from inside the image (step S106). For example, the image processor 102 performs character recognition of the image 601 presuming that the characters inside the image 601 are "English", and obtains the recognized character string "Sale Water Best bang for the buck".

The image processor 102 associates and caches the recognized character string with the image ID information and the language for recognition (step S107). For example, as illustrated in FIG. 6, the image processor 102 associates the recognized character string "Sale Water Best bang for the buck" with the image URL "http://xxx.601.jpg" and the language for recognition "English", and registers these in the extracted information table 101a.

The image processor 102 then outputs the extracted recognized character string (step S108). For example, the image processor 102 outputs the recognized character string "Sale Water Best bang for the buck" to the response transmitter 103 as the result of character recognition.

The response transmitter 103 transmits the response, in which the recognized character string that was outputted in step S103 or step S108 is specified, to the transmitter 200 (step S104). For example, the response transmitter 103 transmits a response, in which the recognized character string "Sale Water Best bang for the buck" is specified, to the terminal 200.

With this embodiment, when the result of character recognition for an image is already obtained, it is possible to omit the process of acquiring the image and performing character recognition. Then, by translating the character strings for which the result of character recognition has been obtained, it is possible to shorten the time required for translating the character strings inside the image.

(4. Basic Construction of a Server of a Second Embodiment)

A server 100 of a second embodiment is able to omit the process of acquiring an image and performing character recognition when the process of character recognition has already been performed for an area specified inside an image when translating character strings that are included in the image.

The server 100 of this embodiment, as in the first embodiment, has a request receiver 101, an image processor 102 and a response transmitter 103 (see FIG. 4); however, the functions and information handled by each part are different from those of the first embodiment. This will be explained in detail below.

The request receiver 101 receives a request, in which ID information for an image and a specified area inside that image are specified, from the terminal 200.

Here, the specified area, for example, is an area inside the image of a WEB page that is specified by a user operating the terminal 200. For example, the specified area is taken to be an area that is designated by a rectangular shape and specified by the coordinates of the upper left corner and lower right corner of the rectangle.

Figure 9A:
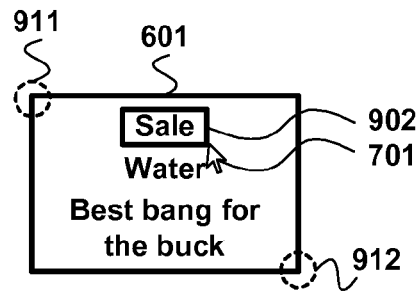
FIGS. 9A to 9D are drawings for explaining specified areas.

For example, as illustrated in FIG. 9A, the user uses the terminal 200 and selects an area 902 inside the image 601 by dragging a cursor 701. Here, the coordinates of the upper left corner 911 of the image 601 (taken to be the "(vertical coordinate, horizontal coordinate)") are set as (0, 0), and the coordinates of the lower right corner 912 are set as (200, 300). Moreover, the coordinates of the upper left corner of area 902 are taken to be (5, 100), and the coordinates of the lower right corner are (48, 200). After the area 902 has been specified by the user, the terminal 200 transmits a request, in which the image URL "http://xxx.601.jpg" of the image 601, and the specified area "(5, 100):(48, 200)" are specified, to the server 100. The request receiver 101 of the server 100 receives that request.

Figure 9B:
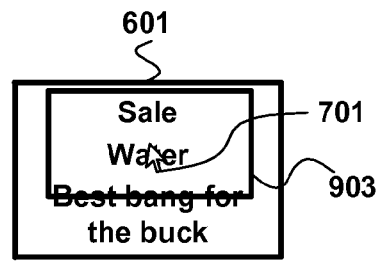

The method for specifying the specified area is not limited to that described above. For example, as illustrated in FIG. 9B, a rectangle 903 having a specified size with a cursor 701 in the center can be displayed when the cursor is placed inside the image, and the area of that rectangle 903 is potentially specified as the specified area. Moreover, the specified area is not limited to a rectangle, and could also be a circle and the like.

The image processor 102 acquires an image based on the ID information that is specified in the received request, and by performing character recognition of the specified area inside the acquired image, outputs a recognized character string that was recognized from that specified area in the image.

For example, when a request, in which the image URL "http://xxx.601.jpg" and the specified area "(5, 100):(48, 200)" are specified, is received, the image processor 102 first acquires the image 601 from the WEB server 400 based on the image URL. Next, the image processor 102 determines the language for recognition for performing character recognition. For example, when a domain code indicating a country is included in the URL of the WEB page 600, the image processor 102 determines from that domain code the language of the characters included in the image. For example, when ".UK" is included in the domain code, the image processor 102 determines "English" as the language for recognition. Alternatively, the image processor 102 determines whether there is a tag in the html that specifies the language, and when there is such a tag, takes that language to be the language for recognition. For example, when there is a tag "<html lang="en">" inside the html, the image processor 102 takes "English" to be the language for recognition. In this embodiment, it is presumed that the image processor 102 has determined "English" to be the language for recognition. The image processor 102 performs character recognition presuming the characters that are included in the specified area "(5, 100):(48, 200)" in the acquired image 601 to be "English". When the characters inside the specified area are determined to be "Sale" as a result of character recognition, the image processor 102 outputs this character string as the recognized character string.

After the recognized character string has been extracted, the image processor 102 associates the recognized character string with the image ID information and the specified area, and caches that recognized character string.

For example, as illustrated in FIG. 10, the image processor 102 associates the recognized character string "Sale" with the image URL "http://xxx.601.jpg" of the image 601 and the language for recognition "English" and the specified area "(5, 100):(48, 200)", and registers them in the extracted information table 101*a*.

Here, after the recognized character string has been extracted, it is possible for the image processor 102 to correct the specified area to a recognized area inside the specified area where the recognized character string was recognized, and then cache that recognized character string.

The recognized area, for example, is a rectangle that includes a recognized character string, and is an area that is identified by a rectangle for which lengths in the vertical direction and horizontal direction of the rectangle have been minimized. For example, the recognized area for "Sale" (area 921 in FIG. 11) is "(8, 110):(45, 170)", the recognized area for "Water" (area 922 in FIG. 11) is "(60, 120):(90, 180)", and the recognized area for "Best bang for the buck" (area 923 in FIG. 11) is "(110, 25):(190, 270)".

For example, as illustrated in FIG. 9A, a request is received in which area 902 is specified as the specified area, and the specified area is specified as "(5, 100):(48, 200)". In this case, the image processor 102 performs character recognition for that specified area, and after the character string "Sale" has been extracted, the image processor 102 obtains the recognized area in which that character string is included. Then, as illustrated in FIG. 12, the image processor 102 associates the recognized character string "Sale" with the image URL "http://xxx.601.jpg", the language for recognition "English" and the specified area (recognized area) "(8, 110):(45, 170)", and registers them in the extracted data table 101*a*.

Figure 9C:
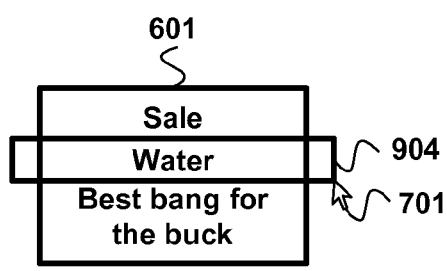

Moreover, as illustrated in FIG. 9C, for example, the area 904 that protrudes from the image 601 is specified as the specified area, and a request in which the specified area "(52, −20):(98, 320) is specified is received. In this case, as illustrated in FIG. 12, the image processor 102 associates the recognized character string "Water" with the image URL "http://xxx.601.jpg" of the image 601, the language for recognition "English" and the specified area (recognized area) "(60, 120):(90, 180)", and registers them in the extracted information table 101a.

Figure 9D:
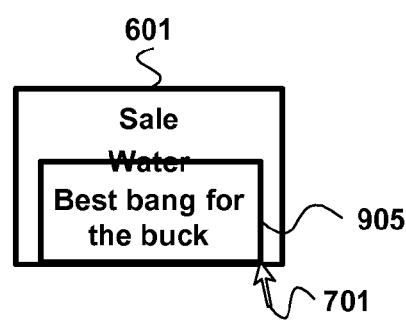
Figure 11:
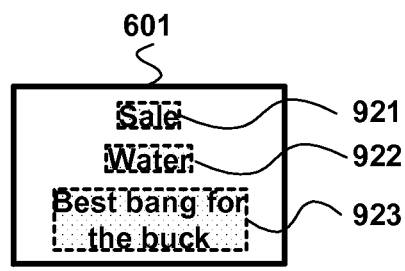
FIG. 11 is a drawing for explaining a recognized area.

Furthermore, as illustrated in FIG. 9D, for example, an area 905 the cuts through the character string inside the image 601 is specified as the specified area, and a request in which the specified area "(85, 15):(210, 285)" is specified is received. In this case, as illustrated in FIG. 12, the image processor 102 associates the recognized character string "Best bang for the buck" with the image URL "http;//xxx.601.jpg" of the image 601, the language for recognition "English" and the specified area (recognized area) "(110, 25):(190, 270)", and registers them in the extracted information table 101a.

The response transmitter 103 transmits a response, in which the recognized character string that was outputted from the image processor 102 is specified, to the terminal 200.

Figure 13A:
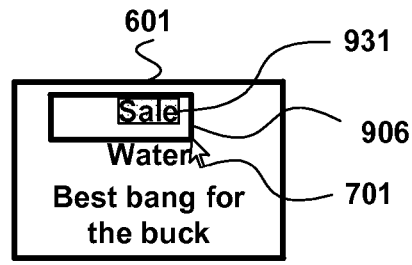
FIGS. 13A to 13D are drawings for explaining overlapping of the specified area.
Figure 13B:
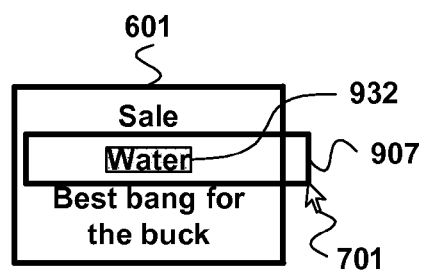
Figure 13C:
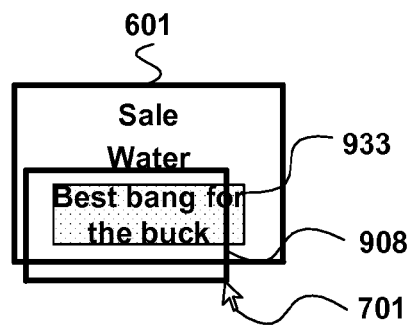
Figure 13D:
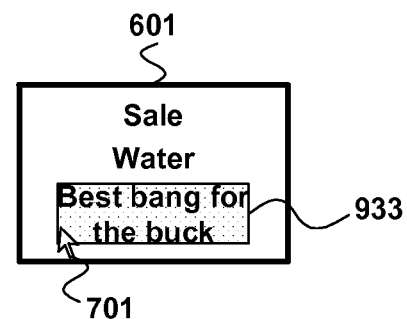

For example, after receiving a response in which the recognized character string "Sale" is specified, the terminal 200, as illustrated in FIG. 13A, displays a semi-transparent rectangle 931 over the recognized area of the recognized character string "Sale" for which character recognition is finished. Similarly, as illustrated in FIG. 13B to FIG. 13D, semi-transparent rectangles 932, 933 are displayed over the recognized areas.

When the recognized character string, for which the ID information and the specified area included in the parameter that are specified in the received request are associated, is cached, the image processor 102 then obtains the cached recognized character string instead of obtaining an image and performing character recognition, and outputs that obtained recognized character string.

Here, when the ID information that was associated with the recognized character string when that recognized character string was cached matches the ID information that is specified in the received request, and the specified area that was associated with recognized character string when that recognized character string was cached overlaps the specified area that is specified in the received request, the image processor 102 determines that extracted information that is associated with the ID information and specified area that is included in the parameter that are specified in the received request is cached.

For example, as illustrated in FIG. 13A, when a user specifies area 906, the request receiver 101 receives a request that specifies the image URL of the image 601 and the specified area "(5, 35):(52, 200)". After that request has been received, the image processor 102 references the extracted information table 101a in FIG. 12. There is a recognized character string registered in the extracted information table 101a that the image URL of the image 601 matches and for which the specified area "(5, 35):(52, 200)" that is specified in the request overlaps the cached specified area "(8, 110):(45, 170)". Therefore, the image processor 102 omits the process of acquiring the image and performing character recognition, and outputs the recognized character string "Sale" to the response transmitter 103.

Determining whether or not the specified area that is specified in the request overlaps the specified area that is cached is can be appropriately set up.

For example, as illustrated in FIG. 13A and FIG. 13B, when the specified areas (areas 906, 907) that are specified in the request include all of the cached specified areas (recognized areas, rectangles 931, 932), it is determined that the areas overlap. On the other hand, as illustrated in FIG. 13C, when only part of the specified area (area 908) that is specified in the request overlaps the cached specified area (recognized area, rectangle 933), it is determined that the areas do not match. Alternatively, it is also possible to determine that the areas overlap when the recognized area and the specified area, which is specified in the request, overlap by only a specified ratio of the recognized area. Moreover, as illustrated in FIG. 13D, when the cursor 701 is placed over the recognized area (rectangle 933), it is possible to determine that the areas overlap.

(5. Operation of the Server of the Second Embodiment)

Figure 14:
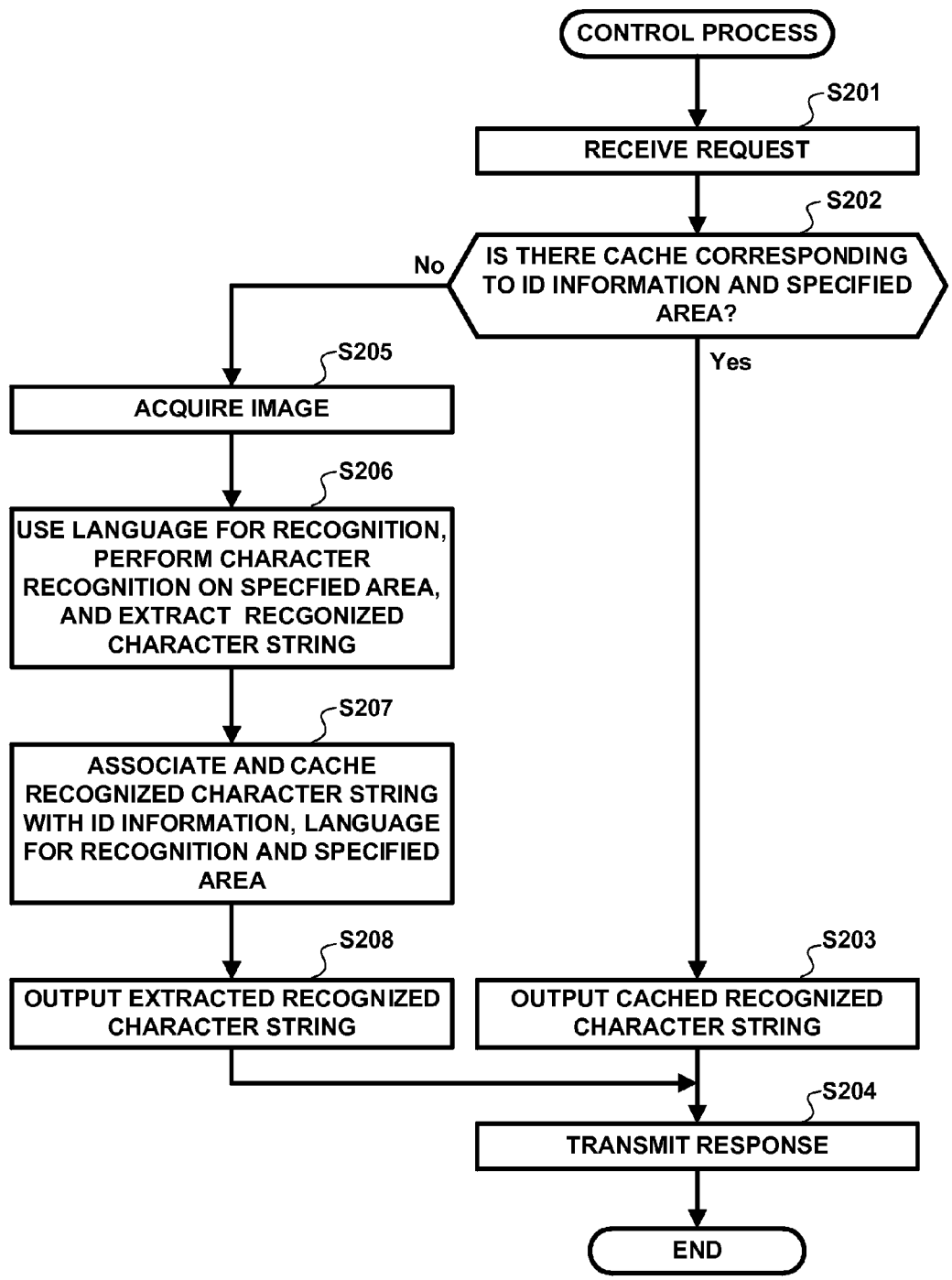
FIG. 14 is a flowchart for explaining the control process that is performed by each part of a server of a second embodiment.

Next, the operations that are performed by each of the parts of the server 100 of this embodiment will be explained using the flowchart in FIG. 14. After the power has been turned ON to the server 100, the CPU 501 starts the control process that is illustrated in the flowchart in FIG. 14.

The request receiver 101 receives the request from the terminal 200 in which the image ID information and the specified area are specified (step S201). For example, when the user specifies the area 902 in FIG. 9A, the request receiver 101 receives the request in which the image URL "http://xxx.601.jpg, and the specified area "(5, 100):(48, 200)" are specified.

The image processor 102 then determines whether or not extracted information (recognized character string), which is associated with the ID information (image URL) and the specified area that are specified in the received request, is cached (step S202).

When it is determined that the recognized character string is cached (step S202; YES), the image processor 102 outputs the cached recognized character string (step S203). For example, the image processor 102 references the extracted information table 101a that is illustrated in FIG. 12, and determines that the image URL matches and that the specified area "(5, 100):(48, 200)" that is specified in the request and the cached specified area (recognized area) "(8, 110):(45, 170)" overlap. In this case, the image processor 102 outputs the recognized character string "Sale" that is associated with the image URL and the recognized area to the response transmitter 103.

On the other hand, when it is determined that the recognized character string is not cached (step S202; NO), the image processor 102 acquires the image of the image URL that is specified in the received request (step S205). For example, when the image URL "http://xxx.601.jpg" does not match, or when the specified area that is specified in the request and the cached specified area do not overlap, the image processor 102 accesses the WEB server 400 and acquires the image 601 that corresponds to the image URL "http://xxx.601.jpg".

After the image has been acquired, the image processor 102 determines the language for recognition, then performs character recognition using that language for recognition and extracts the recognized character string from inside the image (step S206). For example, presuming the characters in the specified area (area 902) of the image 601 to be English, the image processor 102 performs character recognition of the area 902 and obtains the recognized character string "Sale".

The image processor 102 associates and caches the recognized character string with the image ID information, the language for recognition and the specified area (step S207). For example, as illustrated in FIG. 10, the image processor 102 associates the recognized character string "Sale" with the image URL "http://xxx.601.jpg", the language for recognition "English" and the specified area "(5, 100):(48, 200)", and registers them in the extracted information table 101a. It is also possible to correct the specified area to the recognized area "(8, 110):(45, 170)" before registering, and to register the corrected recognized area as illustrated in FIG. 12.

The image processor 102 then outputs the extracted recognized character string (step S208). For example, the image processor 102 outputs the recognized character string "Sale" as the result of character recognition to the response transmitter 103.

The response transmitter 103 transmits the response, in which the recognized character string that was outputted in step S203 or step S208 is specified, to the terminal 200 (step S204). For example, the response transmitter 103 transmits the response, in which the recognized character string "Sale" is specified, to the transmitter 200.

With this embodiment, when the result of character recognition has already been obtained for an area inside an image specified by a user, it is possible to omit the process of acquiring the image and performing character recognition. Moreover, by translating a character string that was obtained as the result of character recognition, it is possible to shorten the time required for translating a character string inside an image.

(6. Basic Construction of a Server of a Third Embodiment)

A server 100 of a third embodiment makes it possible to omit the process of acquiring an image, performing character recognition and performing translation when translating a character string that is included inside an image, in the case where character recognition and translation have already been performed for a specified area inside the image.

The server 100 of this embodiment, as in the second embodiment, includes a request receiver 101, an image processor 102, and a response transmitter 103 (FIG. 4); however, the functions of each of the parts and the information handled differ from those of the second embodiment. This will be explained in detail below.

The request receiver 101 receives a request, in which image ID information, a language for recognition, a specified area and conversion information are specified, from the terminal 200.

The conversion information, for example, is the language (hereafter, referred to as the translation target language) after translation of a character string that is included in an image. A recognized character string that has been extracted from inside an image is translated to the translation target language using the language for recognition.

Figure 15A:
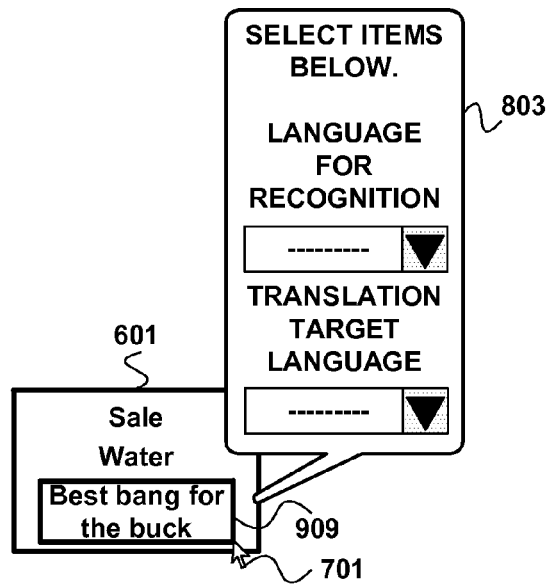
FIGS. 15A to 15C are drawings for explaining examples of the image on the WEB page.
Figure 15B:
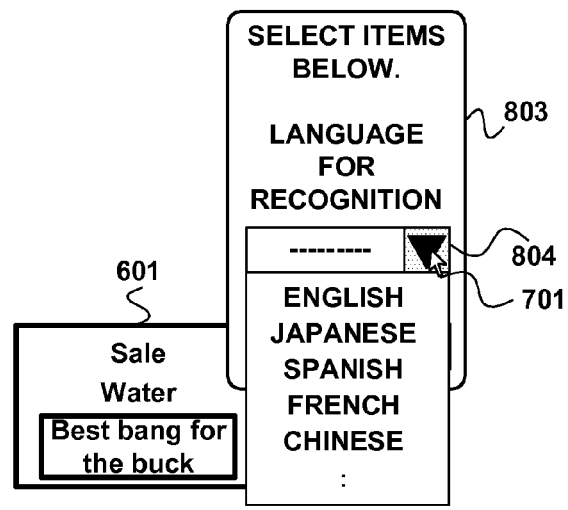
Figure 15C:
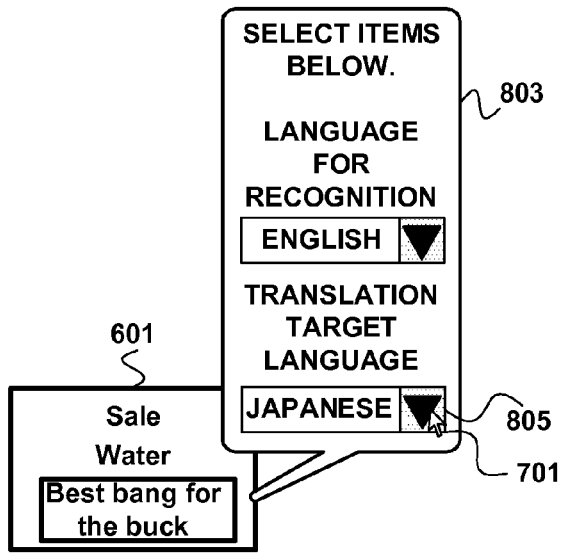

In the following, an example is explained for the case in which a user requests the server 100 to perform translation of the specified area (area 909 having the coordinates "(100, 20):(200, 280)") inside the image 601 on the WEB page 600. For example, when a user, using the terminal 200, drags the cursor 701 and selects the area 909 inside the image 601, a pop-up 803, asking for the language for recognition and the translation target language, is displayed as illustrated in FIG. 15A. Then, as illustrated in FIG. 15B, when the user uses the cursor 701 and clicks on a button 804, a pull-down menu is displayed. The user selects from the menu the language (language for recognition) of a character string inside the area 909. Similarly, the user clicks on the button 805 for the translation target language and selects from the menu the language (translation target language) to which the character string inside the area 909 is to be translated. As illustrated in FIG. 15C, after the language for recognition "English" and the translation target language "Japanese" have been specified, a request, in which the image URL "http://xxx.601.jpg" of the image 601, the specified area "(100, 20):(200, 280)", the language for recognition "English" and the translation target language "Japanese" have been specified, is transmitted to the server 100. The request receiver 101 of the server 100 receives that request.

The image processor 102 acquires an image based on the ID information that was specified in the received request, and by performing character recognition of the specified area inside the acquired image, outputs a recognized character string that was recognized from the specified area inside the image. The image processor 102 then, by performing conversion of the outputted recognized character string using the conversion information (translation target language) that was specified in the received request, outputs a converted character string that was converted from the recognized character string.

For example, the image processor 102 acquires the image 601 that corresponds to the image URL "http://xxx.601.jpg" that was specified in the request from the WEB server 400. Next, the image processor 102 extracts the recognized character string "Best bang for the buck" from the specified area "(100, 20):(200, 280)" using the language for recognition "English". The image processor 102 then converts that recognized character string to the translation target language "Japanese", and outputs the converted character string "お買い得 (Best bang for the buck)" to the response transmitter 103.

After the converted character string has been extracted, the image processor 102 associates the converted character string with the image ID information, the specified area, the language for recognition, the recognized character string and the conversion information, and caches that converted character string. In this embodiment, the specified area that is cached is the recognized area.

For example, as illustrated in FIG. 16, the image processor 102 associates the converted character string "お買い得" with the image URL "http://xxx.601.jpg" of the image 601, the language for recognition "English", the specified area "(110, 25):(190, 270)", the translation target language "Japanese" and the recognized character string "Best bang for the buck", and registers them in the extracted information table 101a. The information to be registered is not limited to this combination, and, for example, it is also possible to not register the translation target information and the converted character string.

When the converted character string has been cached for the ID information (image URL), the specified area, the language for recognition and the conversion information (translation target language) that are specified in the received request, the image processor 102 then obtains the cached converted character string instead of performing the conversion process, and outputs the obtained converted character string.

Figure 17A:
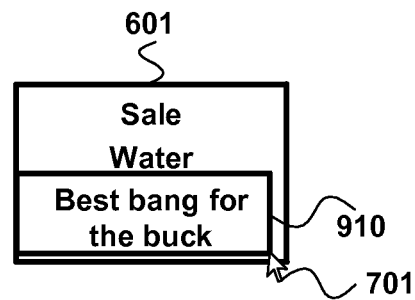
FIGS. 17A to 17D are drawings for explaining examples of the image on the WEB page.
Figure 17B:
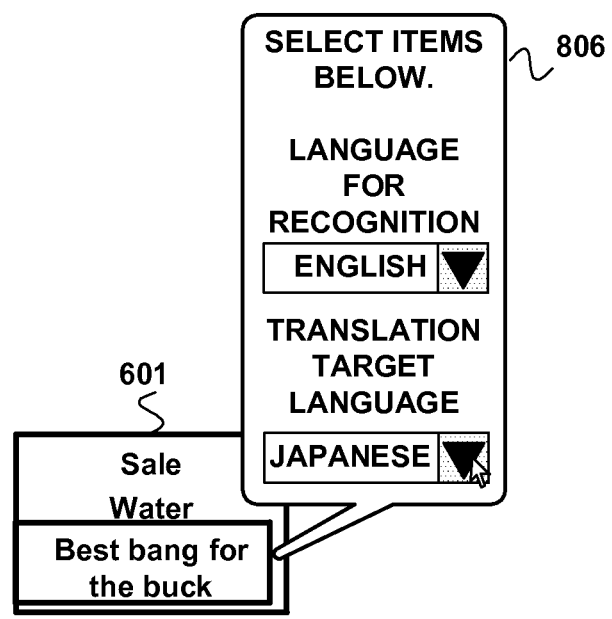

For example, the user specifies the area 910 (the coordinates are "(90, 0):(200, 290)") as illustrated in FIG. 17A, and in a pop-up 806, selects the language for recognition "English" and the translation target language "Japanese". In this case, the request receiver 101 receives a request in which the image URL of the image 601, the specified area "(90, 0):(200, 290)", the language for recognition "English" and the translation target language "Japanese" are specified. The image processor 102 references the extracted information table 101a in FIG. 16 and determines that the image URL, the language for recognition and the translation target language that are specified in the request match the cached information for these, and determines that the specified area "(90, 0):(200, 290)" that was specified in the request, and the specified area "(110, 25):(190, 270)" that is cached overlap. Therefore, the image processor 102 omits the processes of acquiring the image, performing character recognition and performing conversion, and outputs the converted character string "お買い得" to the response transmitter 103.

When the image URL and the language for recognition match, and the specified area that is specified in the request and the specified area that is cached overlap, the image processor 102 can omit only the processes of acquiring the image and performing character recognition, and use the recognized character string that is registered in the extracted information table 101a to convert to the translation target language and obtain the converted character string. For example, the request receiver 101 receives a request in which the image URL of the image 601, the specified area "(90, 0):(200, 290)", the language for recognition "English" and the translation target language "German" are specified. In this case, a corresponding converted character string is not registered in the extracted information table 101a in FIG. 16, so that the image processor 102 performs the conversion processing of translating the recognized character string "Best bang for the buck" to German, and outputs the converted character string.

The response transmitter 103 transmits a response, in which the converted character string that was outputted from the image processor 102 is specified, to the terminal 200.

Figure 17C:
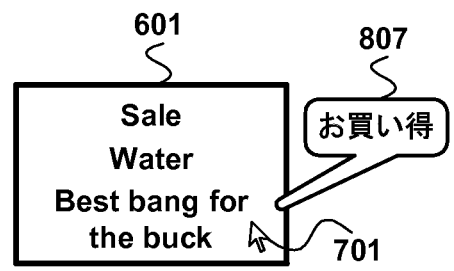
Figure 17D:
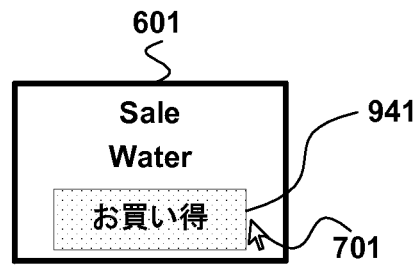

For example, when the terminal 200 receives the response in which the converted character string "お買い得" is specified, then as illustrated in FIG. 17C, a pop-up 807, in which the converted character string "お買い得" is listed, is displayed on the WEB page 600. Alternatively, as illustrated in FIG. 17D, it is possible to display a rectangle 941, in which the converted character string is listed, over the recognized area.

(7. Operation of the Server of the Third Embodiment)

Figure 18:
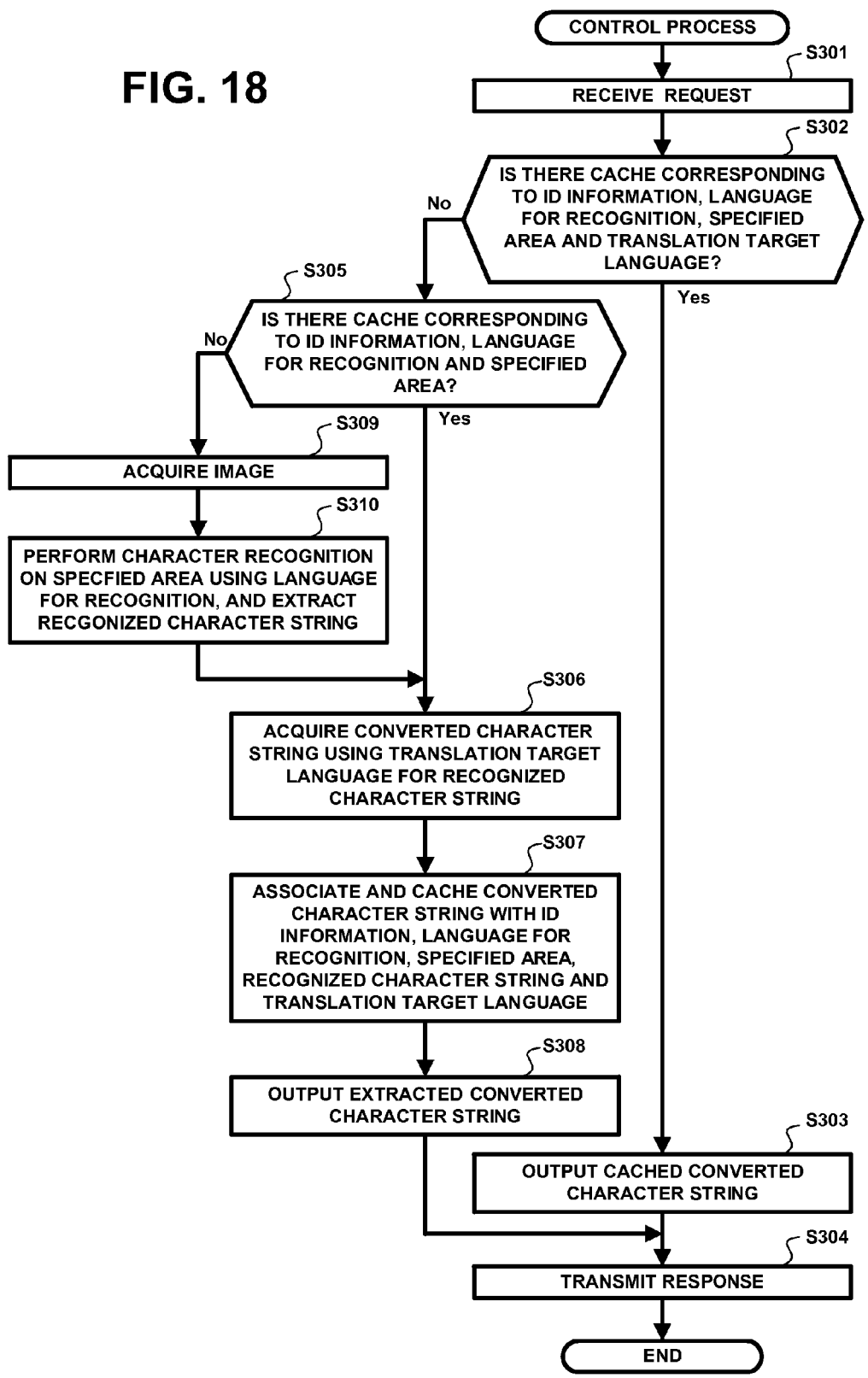
FIG. 18 is a flowchart for explaining the control process that is performed by each part of a server of a third embodiment.

Next, the operations that are performed by each of the parts of the server 100 of this embodiment will be explained using the flowchart in FIG. 18. After the power has been turned ON to the server 100, the CPU 501 starts the control process illustrated in the flowchart in FIG. 18.

The request receiver 101 receives the request from the terminal 200 in which the ID information (image URL) of the image, the specified area, the language for recognition, and the conversion information (translation target language) are specified (step S301). For example, the user specifies the area 909 in FIG. 15A, and as illustrated in FIG. 15C, by specifying the language for recognition and the translation target language in the pop-up 803, the request receiver 101 receives a request in which the image URL "http://xxx.601.jpg", the specified area "(100, 20):(200, 280)", the language for recognition "English" and the translation target language "Japanese" are specified.

The image processor 102 then determines whether or not a converted character string, in which the ID information, the specified area, the language for recognition and that translation target language are associated, is cached (step S302).

When the image processor 102 determines that the converted character string is cached (step S302; YES), the image processor 102 outputs the converted character string that is cached (step S303). For example, the image processor 102 references the extracted information table 101a illustrated in FIG. 16, and determines that the image URL, the language for recognition and the translation target language match, and determines that the specified area "(100, 20):(200, 280)" that was specified in the request and the specified area "(110, 25):(190, 270)" that is cached overlap. In this case, the image processor 102 outputs the converted character string "お買い得" that is associated with the image URL, the specified area, the language for recognition and the translation target language to the response transmitter 103.

On the other hand, when it is determined that the converted character string is not cached, (step S302; NO), the image processor 102 determines whether or not a recognized character string that is associated with the image URL, the specified area and the language for recognitions is cached (step S305).

When it is determined that the recognized character string is cached (step S305; YES), the image processor 102 converts the cached recognized character string to the translation target language and obtains the converted character string (step S306). For example, when the translation target language "Japanese" and the converted character string "お買い得" are not registered in the extracted information table 101a in FIG. 16, the image processor 102 coverts the recognized character string "Best bang for the buck" to the translation target language in "Japanese" and obtains the converted character string "お買い得".

On the other hand, when the recognized character string is not cached (step S305; NO), the image processor 102 acquires the image of the image URL that is specified in the received request (step S309). Then, the image processor 102 performs character recognition for the specified area inside that image and extracts the recognized character string (step S310). For example, when the image URL "http://xxx.601.jpg" do not match, or when the specified area that is specified in the request and the specified area that is cached do not overlap, the image processor 102 accesses the WEB server 400 and acquires the image 601 that corresponds to the image URL "http://xxx.601.jpg". The image processor 102 then performs character recognition for the specified area using the language for recognition "English" that is specified in the request, and extracts the recognized character string "Best bang for the buck".

In step S310, after the recognized character string has been extracted, the image processor 102 performs conversion on that recognized character string (step S306).

The image processor 102 associates and caches the converted character string with the image ID information, the language for recognition, the translation target language, the specified area and the recognized character string (step S307). The image processor 102 then outputs the acquired converted character string to the response transmitter 103 (step S308). For example, as illustrated in FIG. 16, the image processor 102 associates the converted character string "お買い得" with the image URL "http://xxx.601.jpg", the language for recognition "English", the translation target language "Japanese", the specified area (recognized area) "(110, 25):(190, 270)" and the recognized character string "Best bang for the buck", and registers them in the extracted information table 101a. The image processor 102 then outputs the converted character string "お買い得" to the response transmitter 103.

Next, the image processor 102 transmits the response, in which the converted character string that was outputted in step S303 or step S308 is specified, to the terminal 200 (step S304). For example, the response transmitter 103 transmits the response, in which the converted character string "お買い得" is specified, to the terminal 200.

With this embodiment, when the result of conversion (translation result) of an area inside an image that was specified by a user has already been obtained, it is possible to omit the processes of acquiring the image, performing character recognition and performing conversion. As a result, the time required for translating a character string inside an image can be shortened.

(8. Basic Construction of a Server of a Fourth Embodiment)

A server 100 of a fourth embodiment submits to a user whether or not processing for character recognition of an image is completed.

Figure 19:
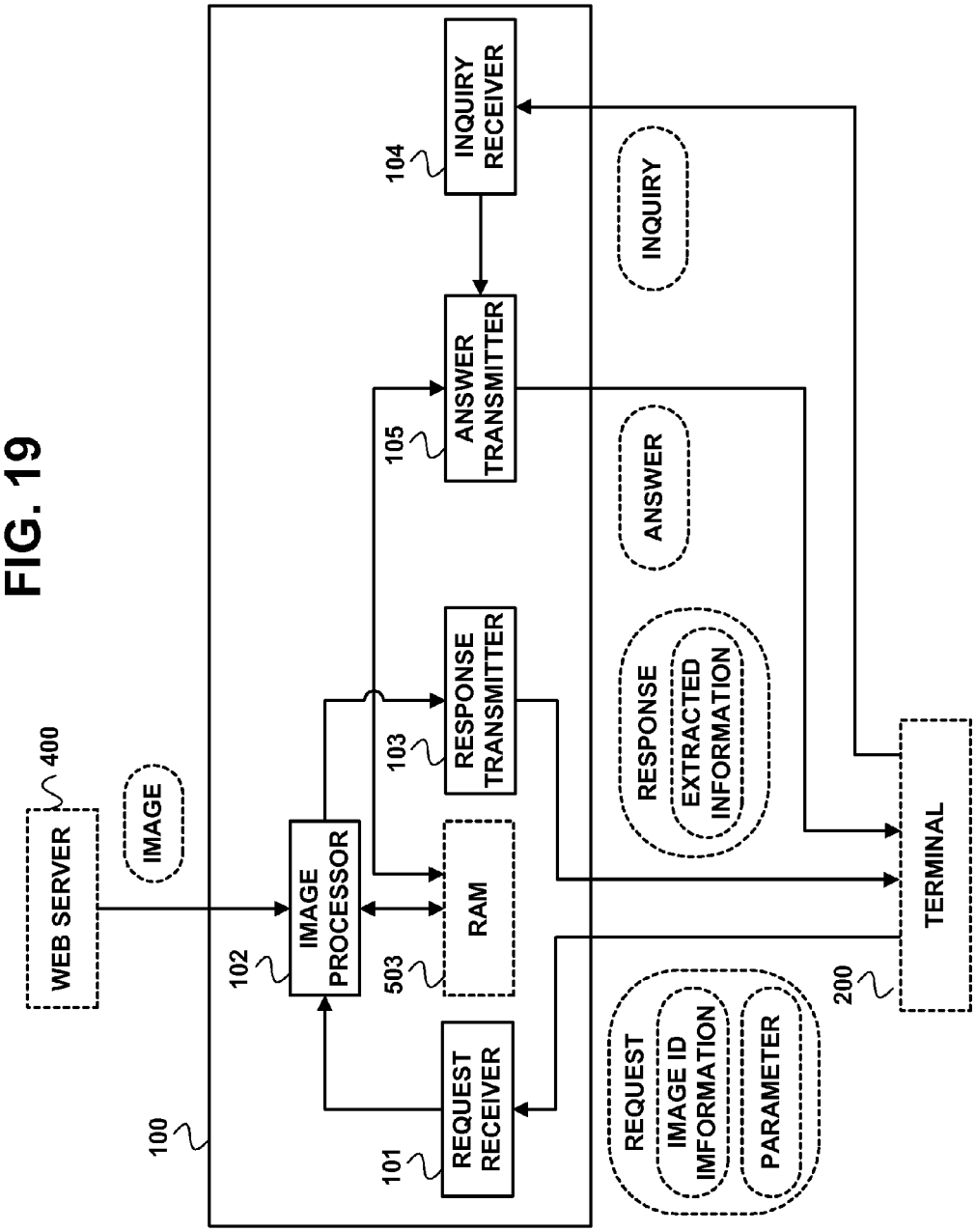
FIG. 19 is a drawing for explaining the basic construction of a server of a fourth embodiment.

The server 100 of this embodiment, as illustrated in FIG. 19, includes a request receiver 101, an image processor 102, a response transmitter 103, an inquiry receiver 104 and an answer transmitter 105. The request receiver 101, the image processor 102 and the response transmitter 103 of this embodiment have the same functions as in the first embodiment. In the following, the inquiry receiver 104 and answer transmitter 105 that have different functions will be explained.

The inquiry receiver 104 receives an inquiry from the terminal 200 in which image ID information is specified.

Figure 20A:
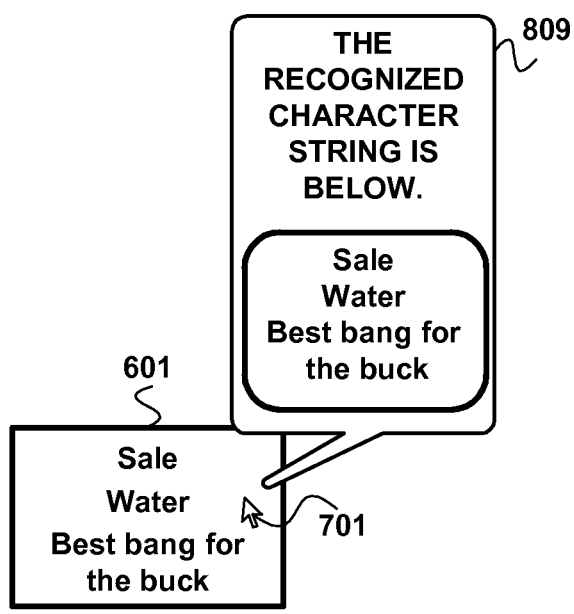
FIGS. 20A and 20B are drawings for explaining examples of the image on the WEB page.

For example, as illustrated in FIG. 20A, when the user places the cursor 701 inside the image 601 (mouse over), the terminal 200 transmits an inquiry, in which the image URL of the image 601 is specified, to the server 100. The inquiry receiver 104 of the server 100 receives that inquiry.

In this embodiment, the CPU 501 and the NIC 504 working together function as the inquiry receiver 104. The same is also true in the fifth and sixth embodiments described later.

When the extracted information that is associated with the ID information that was specified in the received inquiry is not cashed, the answer transmitter 105 transmits an answer, in which a message is specified that prompts transmission of a request, in which the image ID information and the parameter of the image processing are specified, to the terminal 200, and when the extracted information that is associated with the ID information that is specified in the received inquiry is cached, the answer transmitter 105 transmits an answer, in which that extracted information is specified, to the terminal 200.

Here, the parameter of image processing is the language for recognition for character recognition, and the extracted information is a recognized character string. The extracted information table 101a such as illustrated in FIG. 6 is stored in the server 100. The character string "Sale Water Best bang for the buck" that corresponds to the image URL "http://xxx.601.jpg" of the image 601 that is specified in the request is registered in that extracted information table 101a. Therefore, the answer transmitter 105 transmits an answer, in which the recognized character string is specified, to the terminal 200. After the terminal 200 receives that answer, a pop-up 809 that includes the recognized character string is displayed on the WEB page that is displayed on the terminal 200 as illustrated in FIG. 20A.

Figure 20B:
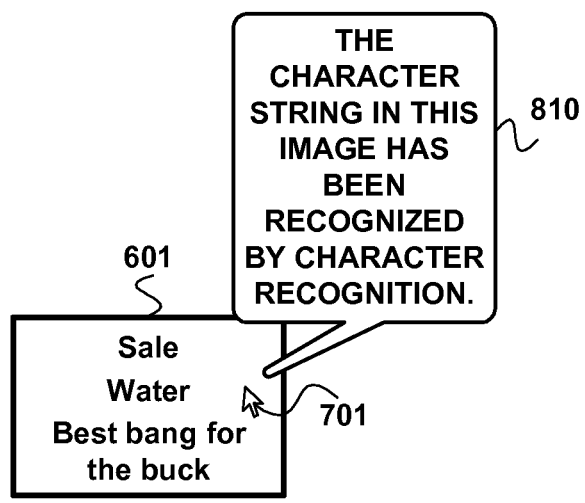

When the recognized character is cached, it also possible for a message, which indicates that the recognized character string was obtained, to be specified in the answer that is transmitted. After the terminal 200 receives the answer, a pop-up 810 that includes the message indicating that the recognized character string was obtained is displayed as illustrated in FIG. 20B.

On the other hand, when the recognized character string that corresponds to the image URL of the image 601 is not cached in the server 100, the answer transmitter 105 transmits an answer, in which a message is specified that prompts transmission of a request in which the image URL of the image 601 and the language for recognition are specified, to the terminal 200. When the terminal 200 receives that answer, a pop-up 801 that asks for input of the language for recognition is displayed on the WEB page that is shown on the terminal 200 as illustrated in FIG. 5A.

In this embodiment, the CPU 501 and the NIC 504 work together to function as the answer transmitter 105. The same is also true in the fifth and sixth embodiment that are described later.

(9. Operation of the Server of the Fourth Embodiment)

Figure 21:
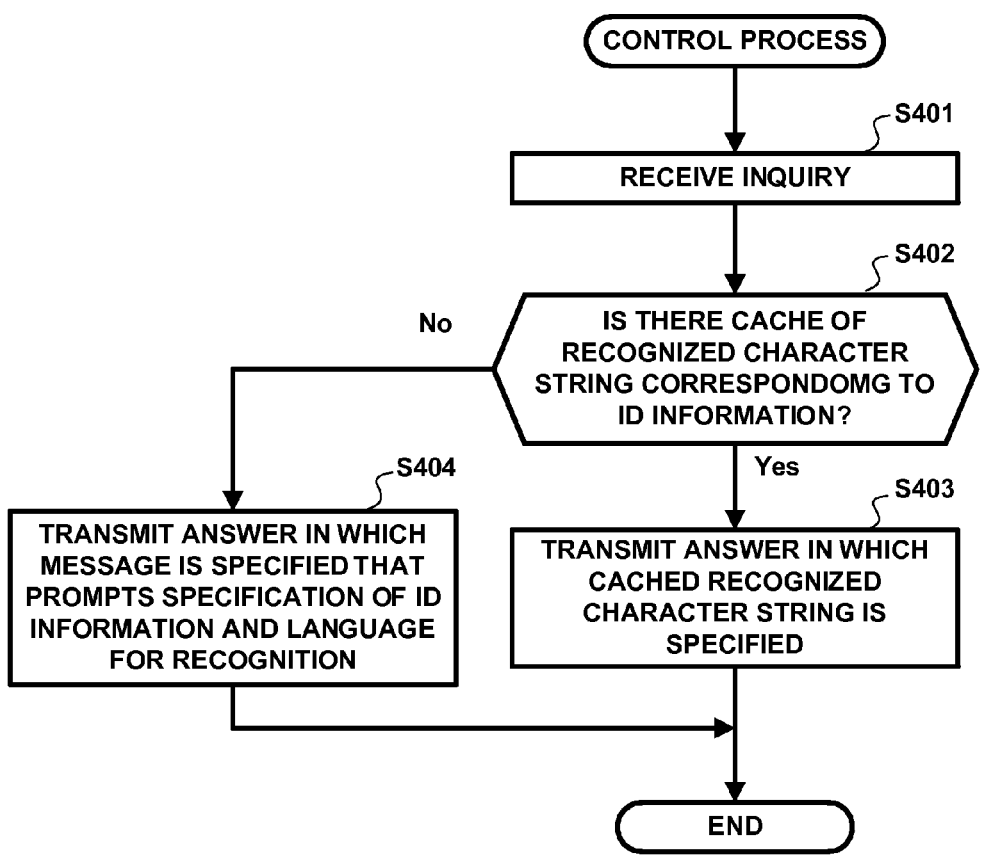
FIG. 21 is a flowchart for explaining the control process that is performed by each part of a server of a fourth embodiment.

Next, the operations that are performed by each of the parts of the server 100 of this embodiment will be explained using the flowchart in FIG. 21. After the power has been turned ON to the server 100, the CPU 501 starts the control process that is illustrated in the flowchart in FIG. 21.

The inquiry receiver 104 receives the inquiry from the terminal 200 in which image ID information is specified (step S401). For example, the inquiry receiver 104 receives an inquiry in which the image URL of the image 601 is specified.

The answer transmitter 105 determines whether or not the recognized character string that is associated with the ID information that was specified in the inquiry is cached (step S402).

When it is determined that the recognized character string is cached (step S402; YES), the answer transmitter 105 transmits an answer, in which the cached recognized character string is specified, to the terminal 200 (step S403). For example, when the recognized character string "Sale Water Best bang for the buck" that is associated with the image URL of the image 601 is registered in the extracted information table 101a (FIG. 6) that is stored in the server 100, the answer transmitter 105 transmits an answer, in which that character string is specified, to the terminal 200.

On the other hand, when it is determined that the recognized character string is not cached (step S402; NO), the answer transmitter 105 transmits an answer, in which a message is specified prompting for specification of the language for recognition, to the terminal 200 (step S404). For example, when the recognized character string that corresponds to the image URL of the image 601 is not registered in the extracted information table 101a that is stored in the server 100, the answer transmitter 105 transmits an answer, in which a message is specified prompting transmission of a request in which the image URL of image 601 and the language for recognition are specified, to the terminal 200.

After that, when the request, in which the image URL of the image 601 and the language for recognition are specified, is received from the terminal 200, the server 100 starts, for example, the control process illustrated in the flowchart in FIG. 8.

With this embodiment, by simply placing a mouse over an image or the like, it is possible to notify a user whether or not processing for character recognition of that image has been completed.

(10. Basic Construction of a Server of a Fifth Embodiment)

A server 100 of a fifth embodiment provides a user with whether or not processing for character recognition of an area inside an image has been completed.

The server 100 of this embodiment, as illustrated in FIG. 19, includes a request receiver 101, an image processor 102, a response transmitter 103, an inquiry receiver 104 and an answer transmitter 105. The request receiver 101, the image processor 102 and the response transmitter 103 have the same functions as in the second embodiment. In the following, the inquiry receiver 104 and the answer transmitter 105 that have different functions will be explained.

The inquiry receiver 104 receives an inquiry, in which image ID information and a position inside that image are specified, from the terminal 200.

Figure 22A:
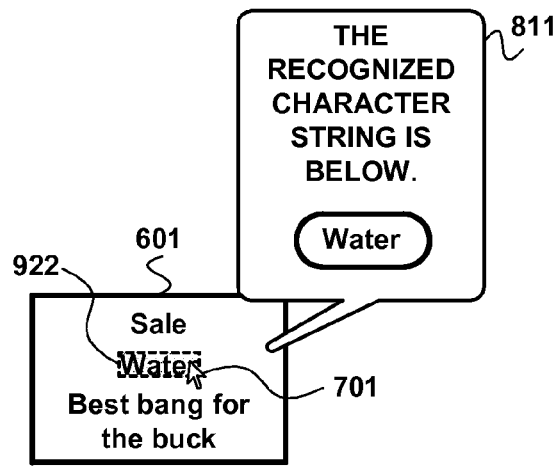
FIGS. 22A to 22C are drawings for explaining examples of the image on the WEB page.

For example, as illustrated in FIG. 22A, when a user places the cursor 701 inside the image 601 (mouse over), the terminal 200 transmits an inquiry, in which the image URL of the image 601 and the coordinates ("(75:175)") of the position of the cursor 701 are specified, to the server 100. The inquiry receiver 104 of the server 100 receives that inquiry.

When a recognized character string, which is associated with the ID information that is specified in the received inquiry, and with the specified area that includes the position that is specified in the received inquiry, is cached by the image processor 102, the answer transmitter 105 transmits an answer, in which the cached recognized character string is specified, to the terminal 200.

For example, it is presumed that the extracted information table 101a illustrated in FIG. 12 is stored in the server 100. As illustrated in FIG. 22A, the coordinates "(75:175)" of the position that was specified in the request is included in the recognized area 922. The recognized character string "Water", which corresponds to the image URL "http://xxx.601.jpg" of the image 601 that was specified in the request and the specified area (recognized area 922) that includes the coordinates of the position that was specified in the request, is registered in that extracted information table 101a. Therefore, the answer transmitter 105 transmits an answer, in which the recognized character string is specified, to the terminal 200. When the terminal 200 receives that answer, a pop-up 811 that includes the recognized character string "Water" is displayed on the WEB page that is shown on the terminal 200 as illustrated in FIG. 22A.

Figure 22B:
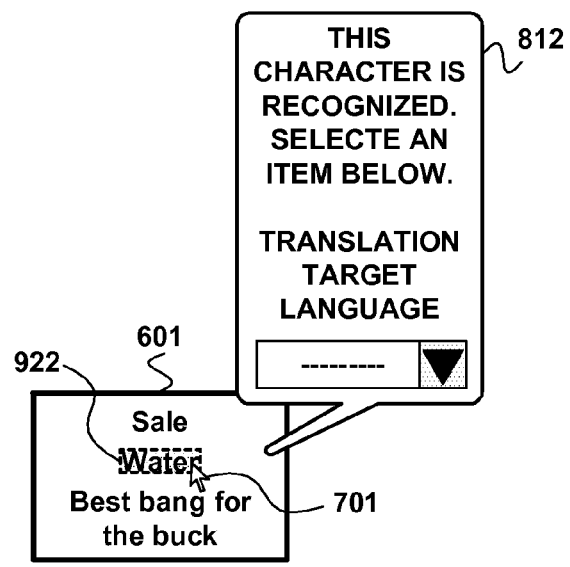

It is also possible to specify a message prompting transmission of a request in which the translation target language is specified in the answer that is transmitted when the recognized character string is cached. After the terminal 200 receives the answer, a pop-up 812 requesting that the translation target language be specified is displayed as illustrated in FIG. 22B.

Figure 22C:
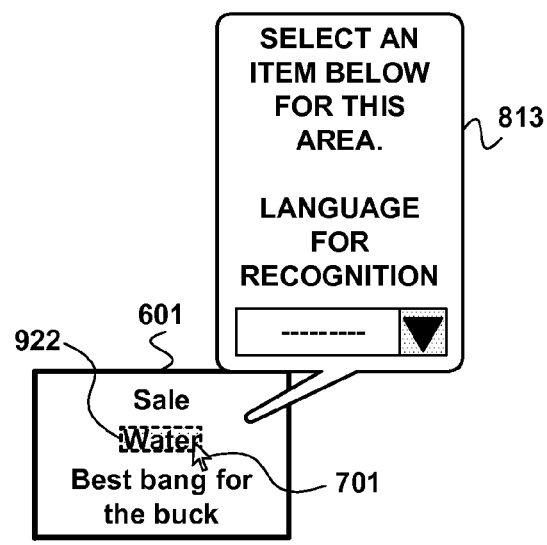

On the other hand, when the recognized character string, which corresponds to the image URL of the image 601, and to the specified area in which the specified position is included, is not cached in the server 100, the answer transmitter 105 transmits an answer, in which a message is specified prompting transmission of a request in which the image URL of the image 601, the position inside the image and the language for recognition are specified for that specified area, to the terminal 200. When the terminal 200 receives that answer, a pop-up 813 requesting input of the language for recognition is displayed on the WEB page that is shown on the terminal 200 as illustrated in FIG. 22C.

(11. Operation of the Server of the Fifth Embodiment)

Figure 23:
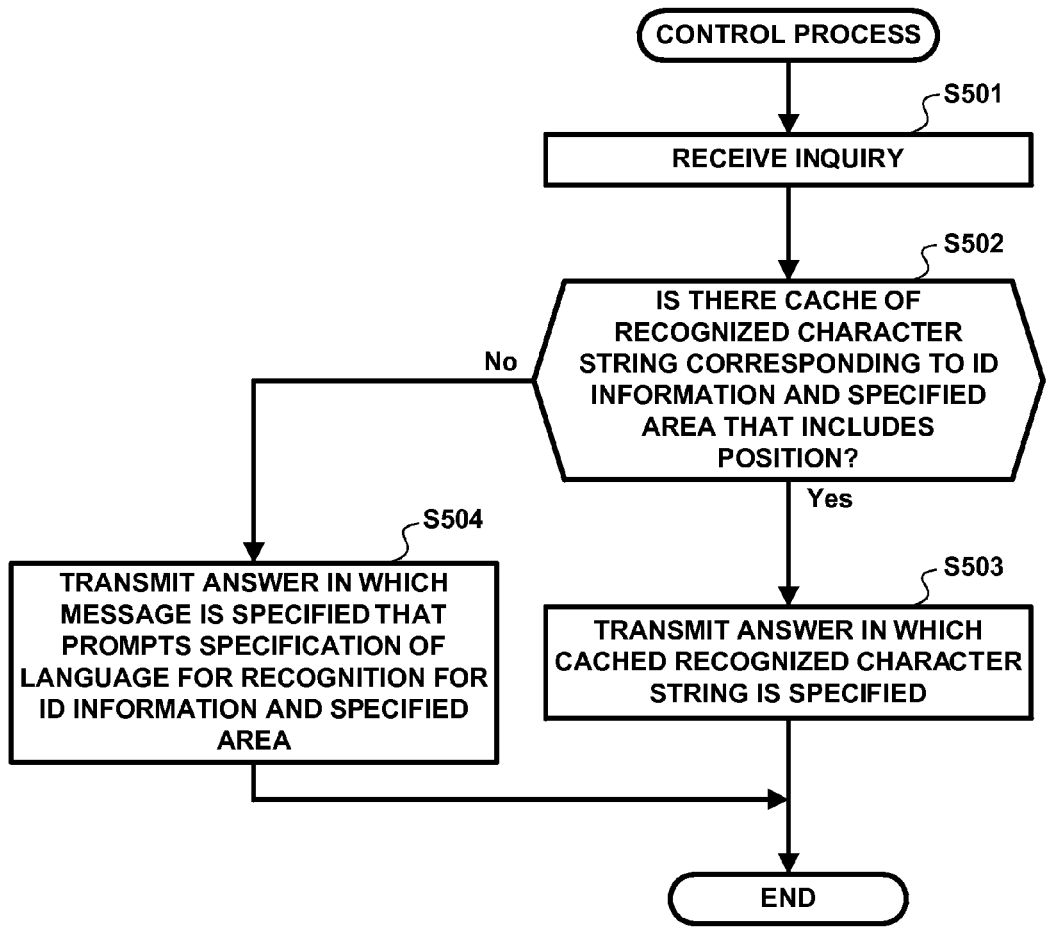
FIG. 23 is a flowchart for explaining the control process that is performed by each part of a server of a fifth embodiment.

Next, the operations that are performed by each of the parts of the server 100 of this embodiment will be explained using the flowchart in FIG. 23. After the power has been turned ON to the server 100, the CPU 501 starts the control process that is illustrated in the flowchart in FIG. 23.

The inquiry receiver 104 receives an inquiry from the terminal 200 in which image ID information and a position inside that image are specified (step S501). For example, the inquiry receiver 104 receives an inquiry in which the image URL of the image 601 and the position "(75:175)" are specified.

The answer transmitter 105 determines whether or not a recognized character string, which is associated with the ID information and the specified area that includes the position that were specified in the inquiry, is cached (step S502).

When it is determined that the recognized character string is cached (step S502; YES), the answer transmitter 105 transmits an answer, in which the cached recognized character string is specified, to the terminal 200 (step S503). For example, when the recognized character string "Water" that corresponds to the image URL of the image 601 and the specified area that includes the specified position "(75:175)" is registered in the extracted information table 101a that is stored in the server 100 (FIG. 12), the answer transmitter 105 transmits an answer, in which that recognized character string is specified, to the terminal 200.

On the other hand, when it is determined that the recognized character string is not cached (step S502; NO), the answer transmitter 105 transmits an answer, in which a message is specified prompting specification of the language for recognition for the specified area of that image, to the terminal 200 (step S504). For example, when a recognized character string that corresponds to the image URL of the image 601 and the specified area that includes the specified position is not registered in the extracted information table 101a that is stored in the server 100, the answer transmitter 105 transmits an inquiry, in which a message is specified that prompts that a request in which the image URL of the image 601, the specified area and the language for recognition are specified be transmitted, to the terminal 200.

With this embodiment, by simply placing the mouse over an area inside an image or the like, it is possible to notify a user whether or not character recognition has been completed for that area.

(12. Basic Construction of a Server of a Sixth Embodiment)

A server 100 of a sixth embodiment provides a user with whether or not a conversion processing has been completed for an area inside an image.

The server 100 of this embodiment, as illustrated in FIG. 19, includes a request receiver 101, and a image processor 102, a response transmitter 103, an inquiry receiver 104 and an answer transmitter 105. The request receiver 101, the image processor 102 and the response transmitter 103 have the same functions as in the third embodiment. In the following, the inquiry receiver 104 and the answer transmitter 105 that have different functions will be explained.

The inquiry receiver 104 receives an inquiry from the terminal 200 in which image ID information, a position inside that image and conversion information are specified.

For example, as illustrated in FIG. 22A, when a user places the cursor 701 inside the image 601, the pop-up 812 is displayed as illustrated in FIG. 22B asking that the translation target language (conversion information) be specified. After the user selects an arbitrary translation target language (for example, Spanish), the terminal 200 transmits an inquiry, in which the image URL of the image 601, the coordinates "(75:175)" of the cursor 701 position and the translation target language "Spanish" are specified, to the sever 100. The inquiry receiver 104 of the server 100 receives that inquiry.

When the converted character string that is associated with the ID information and the conversion information that are specified in the received inquiry, and that is associated with a specified area that includes the position that is specified in the received inquiry is cached by the image processor 102, the answer transmitter 105 transmits an answer in which the cached converted character string is specified.

Figure 25A:
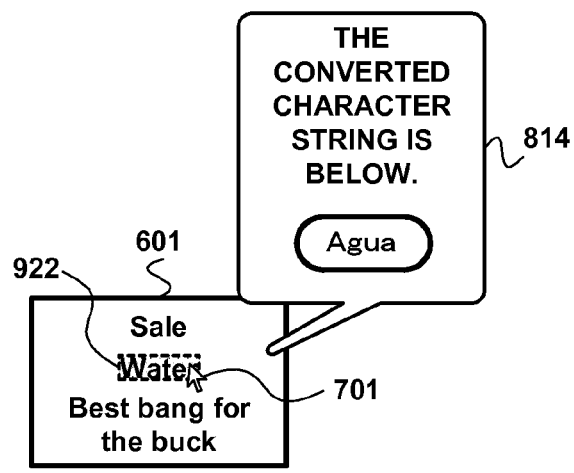
FIGS. 25A to 25C are drawings for explaining examples of the image on the WEB page.

For example, it is presumed that an extracted information table 101a as illustrated in FIG. 24 is stored in the server 100. The image URL "http://xxx.601.jpg" of the image 601 that was specified in the request, the specified area (recognized area 922) that includes the coordinates of the position that was specified in the request, and the converted character string "Agua" that corresponds to the translation target language "Spanish" are registered in the extracted information table 101a. Therefore, the answer transmitter 105 transmits an answer, in which the converted character string is specified, to the terminal 200. When the terminal 200 receives that answer, a pop-up 814 that includes the converted character string "Agua" is displayed on the WEB page that is shown on the terminal 200 as illustrated in FIG. 25A.

Figure 25B:
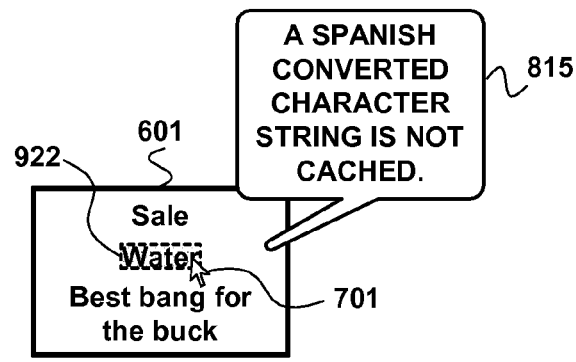

On the other hand, when the converted character string, which corresponds to the image URL of the image 601, the specified area that includes the specified position, and the translation target language, is not cached in the server 100, the answer transmitter 105 transmits a response, in which a message that indicates that the converted character string is not cached is specified, to the terminal 200. When the terminal 200 receives that answer, a pop-up 815 that includes the message indicating that the converted character string is not cached is displayed on the WEB page that is shown on the terminal such as illustrated in FIG. 25B.

(13. Operation of the Server of the Sixth Embodiment)

Figure 26:
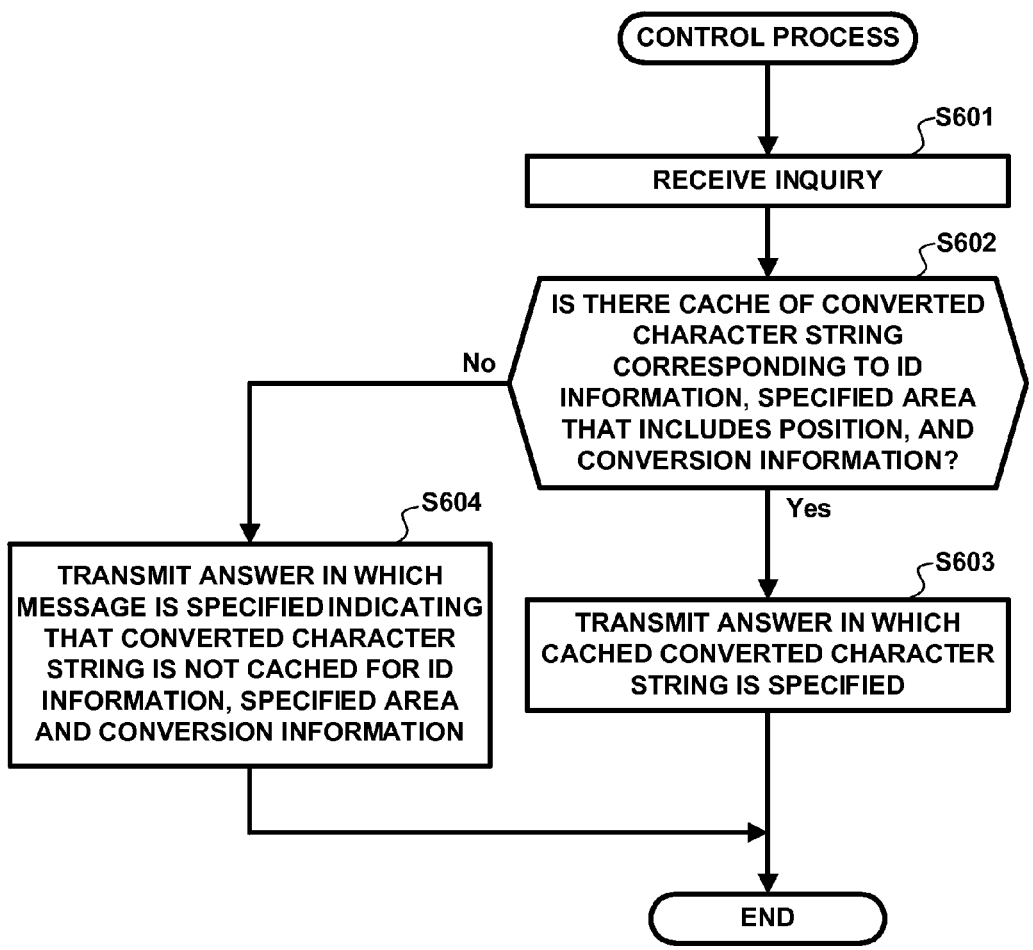
FIG. 26 is a flowchart for explaining the control process that is performed by each part of a server of a sixth embodiment.

Next, the operations that are performed by each part of the server 100 of this embodiment will be explained using the flowchart in FIG. 26. After the power has been turned ON to the server 100, the CPU 501 starts the control process that is illustrated in the flowchart in FIG. 26.

The inquiry receiver 104 receives the inquiry, in which the image ID information, the position inside that image, and the conversion information are specified, from the terminal 200 (step S601). For example, the inquiry receiver 104 receives the inquiry in which the image URL of the image 601, the position "(75:175)", and the translation target information "Spanish" are specified.

The answer transmitter 105 determines whether or not the converted character string, which is associated with the ID information, the specified area that includes the position and the translation target language that were specified in the inquiry, is cached (step S602).

When it is determined that the converted character string is cashed (step S602; YES), the answer transmitter 105 transmits the answer, in which the cached converted character string is specified, to the terminal 200 (step S603). For example, when the converted character string "Agua", which corresponds to the image URL of the image 601, the specified area that includes the specified position "(75:175)" and the translation target language "Spanish", is registered in the extracted information table 101*a* that is stored in the server 100 (FIG. 24), the answer transmitter 105 transmits an answer, in which that converted character string is specified, to the terminal 200.

On the other hand, when it is determined that the converted character string is not cached (step S602; NO), the answer transmitter 105 transmits the answer, in which a message is specified indicating that the converted character string is not cached, to the terminal 200 (step S604). For example, when the converted character string, which corresponds to the image URL of the image 601, the specified area that includes the specified position and the translation target language "Spanish", is not registered in the extracted information table 101*a* that is stored in the server 100, the answer transmitter 105 transmits the answer, in which the message is specified indicating that the converted character string is not cached, to the terminal 200.

In this embodiment, it is also possible for the inquiry receiver 104 to receive an inquiry in which the image URL and the position are specified, and for the answer transmitter 105 to transmit an answer in which the converted character string, which corresponds to that image URL and the specified area that includes the position, is specified.

Figure 25C:
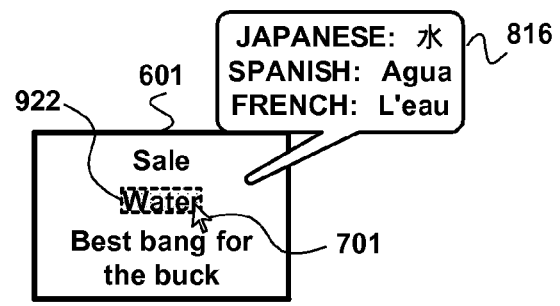

For example, when an inquiry is received in which the image URL of the image 601 and the specified position "(75:175)" are specified, the answer transmitter 105 references the extracted information table 101*a* in FIG. 24, and acquires the converted character strings "水 (Water)", "Agua", "L'eau" that correspond to the image URL and the specified areas that includes the position. The answer transmitter 105 then transmits the answer, in which all of these converted character strings are specified, to the terminal 200. After the terminal 200 receives that answer, a pop-up 816 such as illustrated in FIG. 25C is displayed on the terminal 200. Alternatively, the answer transmitter 105 can select the converted character string that corresponds to the translation target language that has been specified with the highest frequency up to that point in a request, and transmit an answer in which that converted character string is specified. Moreover, it is also possible for the answer transmitter 105 to alternatively select at random from the converted character strings that are registered in the extracted information table 101*a*, and transmit an answer in which that converted character string is specified.

With this embodiment, by simply placing the mouse over an area inside an image or the like, it is possible to notify a user whether or not conversion processing (translation process) has been completed for that area.

(14. Basic Construction of a Terminal of a Seventh Embodiment)

A program of a seventh embodiment functions so that results of character recognition or conversion processing that was performed by a server are displayed on a terminal that is capable of communicating with the server.

Figure 27:
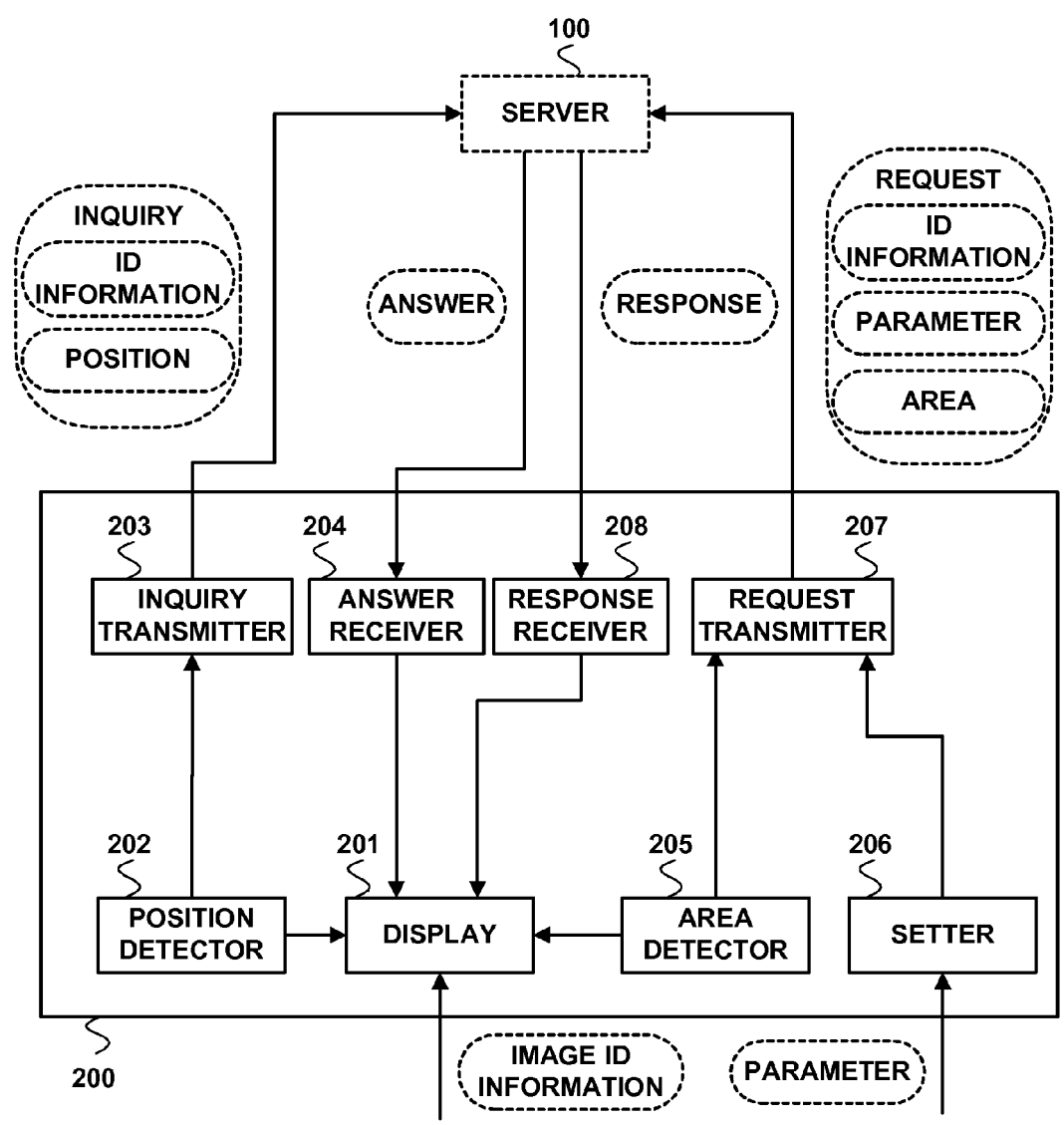
FIG. 27 is a drawing for explaining the basic construction of a terminal that a program of a seventh embodiment operates.

As illustrated in FIG. 27, the terminal 200 on which the program of this embodiment operates includes a display 201, a position detector 202, an inquiry transmitter 203, an answer receiver 204, an area detector 205, a setter 206, a request transmitter 207 and a response receiver 208.

The display 201 displays on a screen an image that was identified according to ID information.

For example, the display 201, as illustrated in FIG. 22A, displays the image 601 that is specified by the image URL "http://xxx.601.jpg".

In this embodiment, the CPU 501 and the image processor 505 work together to function as the display 201.

The position detector 202 detects a selection of a position inside the image that is displayed on the screen.

For example, when the cursor 701 is placed inside the image, the position detector 202, as illustrated in FIG. 22A, detects the coordinates of the position of that cursor 701.

In this embodiment, the CPU 501 and the image processor 505 work together to function as the position detector 202.

After the selection of the position has been detected, the inquiry transmitter 203 transmits an inquiry, in which the ID information and the selected position are specified, to the server 100.

For example, in the case illustrated in FIG. 22A, the inquiry transmitter 203 transmits an inquiry, in which the image URL of the image 601 and the coordinates "(75:175)" of the position are specified, to the server 100.

In this embodiment, the CPU 501 and the NIC 504 work together to function as the inquiry transmitter 203.

The response receiver 204 receives a response from the server 100. The display 201 then further displays the extracted information that is specified in the received response on the screen.

For example, the answer receiver 204 receives an answer in which the recognized character string "Water" is specified. In this case, as illustrated in FIG. 22A, the display 201 displays the pop-up 811 that includes that recognized character string.

In this embodiment, the CPU 501 and the NIC 504 work together to function as the answer receiver 204.

The area detector 205 detects a selection of an area inside the image that is displayed on the screen.

For example, as illustrated in FIG. 9A, when the cursor 701 is dragged inside the image, the area detector 205 detects the coordinates of the dragged area (area 902).

In this embodiment, the CPU 501 and the image processor 505 work together to function as the area detector 205.

The setter 206 prompts setting of parameters for image processing.

For example, the setter 206 prompts setting of the language for recognition that is used in character recognition.

In this embodiment, the CPU 501 functions as the setter 206.

After the selection of the area has been detected, the request transmitter 207 transmits a request, in which the ID information, the set parameter and the selected area are specified, to the server 100.

For example, as illustrated in FIG. 9A, when the area is specified and the coordinates of that area are detected, the request transmitter 207 transmits a request, in which the image URL "http://xxx.601.jpg", the language for recognition "English" and the coordinates "(5, 100):(48, 200)" of the selected area are specified, to the server 100.

In this embodiment, the CPU 501 and the NIC 504 work together to function as the request transmitter 207.

The response receiver 208 receives a response from the server 100. The display 201 then further displays on the screen extracted information that is specified in the received response.

For example, the response receiver 208 receives a response in which the recognized character string "Sale" is specified. In this case, the display 201, as illustrated in FIG. 13A for example, further displays the semi-transparent rectangle 931 over the recognized character string "Sale".

In this embodiment, the CPU 501 and the NIC 504 work together to function as the response receiver 208.

(15. Operation of the Terminal of the Seventh Embodiment)

Next, the operations of each of the parts of the terminal 200 of this embodiment will be explained using the flowchart in FIG. 28. After the power has been turned ON to the terminal 200, the CPU 501 starts the control process illustrated in FIG. 28.

The display 201 displays an image on the screen that was identified from ID information (step S701). The position detector 202 determines whether or not the selection of the position inside the image that is displayed on the screen has been detected (step S702).

For example, the display 201 displays the image 601 for which the image URL "http://xxx.601.jpg" is specified, and when the cursor 701 is placed over that image 601, the position detector 202 detects the coordinates "(75:175)" of the cursor 701 (FIG. 22A).

When the position detector 202 determines that selection of the position has been detected (step S702; YES), the inquiry transmitter 203 transmits an inquiry, in which ID information and the selected position are specified, to the server 100 (step S703). The answer receiver 204 then receives an answer from the server 100 that corresponds to the inquiry (step S704). The display 201 further displays on the screen extracted information that is specified by the received answer (step S705).

For example, the inquiry transmitter 203 transmits an inquiry, in which the image URL of the image 601 and the coordinates "(75:175)" of the position are specified, to the server 100. The answer receiver 204 then receives an answer in which the recognized character string "Water", which was obtained by character recognition for the area that includes the coordinates of the position, is specified. After receiving that answer, the display 201, as illustrated in FIG. 22A, displays the pop-up 811 in which the recognized character string is included.

On the other hand, when the position detector 202 did not determine that the selection of the position was detected (step S702; NO), the area detector 205 determines whether or not the selection of the area inside the image that is displayed on the screen was detected (step S706).

For example, when the user drags the cursor 701 inside the image as illustrated in FIG. 9A, the area detector 205 detects the coordinates "(5, 100):(48, 200)" of the area (area 902) where the cursor 701 was dragged.

When the area detector 205 determines that the selection of the area was detected (step S706; YES), the setter 206 prompts setting the parameter for image processing (step S707). The request transmitter 207 transmits a request, in which the ID information, the set parameter and the selected area are specified, to the server 100 (step S708). The response receiver 208 receives a response from the server 100 that corresponds to the request (step S709). The display 201 further displays on the screen the extracted information that is specified in the received response (step S710).

For example, the setter 206 prompts setting of the language for recognition that will be used in character recognition, and after the language for recognition "English" has been set, the request transmitter 207 transmits a request, in which the image URL of the image 601, the language for recognition "English" and the coordinates "(5, 100):(48, 200)" of the area are specified, to the server 100. The response receiver 208 then receives a response in which the recognized character string "Sale", which was obtained by character recognition for an area that overlaps with the area, is specified. After that response has been received, the display 201, as illustrated in FIG. 13A for example, displays the semi-transparent rectangle 931 over the recognized character string "Sale".

On the other hand, when the area detector 205 did not determine that the selection of the area was detected (step S706; NO), or when processing of steps S705 and S710 is complete, processing returns to step S701.

In this embodiment, it is also possible to further specify area information, which indicates from which area of an image that extracted information was extracted, in the response that is received by the answer receiver 204. Moreover, the program of this embodiment can be such that image ID information, extracted information and area information are associated and cached in the terminal 200. In this case, when the user places the mouse over an area that is included in the cached area information for an image having the same ID information as that image, the display 201 displays the extracted information that corresponds to that area information on the screen.

Moreover, it is possible for the response that is received by the response receiver 208 to specify area information that indicates from which area of an image that extracted information was extracted. The program of this embodiment can cause the image ID information, the extracted information and the area information to be associated and cached in the terminal 200. In this case, when the user selects the area of the image that has the same ID information of that image so as to overlap the area indicated in the cached area information, the display 201 displays on the screen the extracted information that corresponds to that area information. Determining whether or not the areas overlap can be performed, for example, in the same way as in the second embodiment.

Moreover, the program of this embodiment uses various script languages that are executed by a browser.

With this embodiment, it is possible to have the results of character recognition processing and conversion processing that are performed by a server be displayed on a terminal that is capable of communicating with the server, and it is possible to have characters of an image on a WEB page be displayed in real-time on the terminal.

The embodiments described above are for explanation only and do not limit the range of the present invention. Moreover, the present invention is not limited to being applied to specific technical specifications such as illustrated in the embodiments described above. Therefore, it is possible for a person who is skilled in the art to apply embodiments in which each element or all of the elements described in this specification have been replaced with equivalent elements, and those embodiments are also included within the range of the present invention.

The present invention is based on Japanese Patent Application No. 2011-101534 filed on Apr. 28, 2011. The entire specification, claims and drawings of Japanese Patent Application No. 2011-101534 are incorporated in this specification by reference.

INDUSTRIAL APPLICABILITY

With the present invention, it is possible to provide a server, a server control method, a program and a recording medium that are suitable for translating characters in an image on a WEB page in real-time.

REFERENCE SIGNS LIST

100 Server
101 Request receiver
102 Image processor
103 Response transmitter
104 Inquiry receiver
105 Answer transmitter
211, 212 to 21n, 200 Terminal
201 Display
202 Position detector
203 Inquiry transmitter
204 Answer receiver
205 Area detector
206 Setter
207 Request transmitter
208 Response receiver
300 Internet
400 WEB server
500 Information processing device
501 CPU
502 ROM
503 RAM
504 NIC
505 Image processor
506 Audio processor
507 DVD-ROM drive
508 Interface
509 External memory
510 Controller
511 Monitor
512 Speaker
600 WEB page
601, 602, 603 Image
604, 605, 606 Text
701 Cursor
801, 803, 806, 807, 809, 810, 811, 812, 813, 814, 815, 816 Pop-up
802, 804, 805 Button
901, 931, 932, 933, 941 Rectangle
902, 903, 904, 905, 906, 907, 908, 909, 910 Area
911, 912 Corner
921, 922, 923 Recognized area

The invention claimed is:

1. A server comprising:
a request receiver that receives a request in which image ID information and a parameter for image processing are specified, from a terminal;
an image processor that acquires an image based on the ID information that was specified in the received request, and by using the parameter that was specified in the received request to apply the image processing on the acquired image, outputs extracted information that was extracted from inside the image; and
a response transmitter that transmits a response in which the extracted information that was outputted by the image processor is specified, to the terminal; wherein
after the extracted information has been extracted, the image processor associates and caches the extracted information with the image ID information and the parameter;
when the extracted information that is associated with the ID information and the parameter that were specified in the received request is cached, the image processor, instead of acquiring the image and applying the image processing, obtains the cached extracted information, and outputs the obtained extracted information;
the image processing by the image processor includes performing character recognition; and
the extracted information comprises a recognized character string corresponding to the character recognition.

2. The server according to claim 1, wherein
the parameter that is specified in the request includes a specified area;
the image processing by the image processor includes extraction processing that, by performing the character recognition on the specified area inside the image that is included in the parameter, outputs the recognized character string that was recognized from the specified area in the image;
after the recognized character string has been extracted, the image processor associates and caches the recognized character string with the image ID information and the specified area;
when the recognized character string that is associated with the ID information and the specified area included in the parameter that are specified in the received request is cached, the image processor, instead of the character recognition, obtains the cached recognized character string, and outputs the obtained recognized character string; and
the extracted information includes the recognized character string.

3. The server according to claim 2, wherein
when the ID information that was associated when the recognized character string was cached matches the ID information that was specified in the received request, and the specified area that was associated when the recognized character string was cached overlaps the specified area that is included in the parameter that was specified in the received request, the image processor determines that the extracted information that is associated with the ID information and the specified area included in the parameter that were specified in the received request is cached.

4. The server according to claim 2 or 3, wherein
when the recognized character string is extracted, the image processor caches the recognized character string after correcting the specified area to a recognized area in the specified area where the recognized character string was recognized.

5. The server according to claim 2, wherein
the parameter that is specified in the request includes a language for recognition; and
the character recognition by the image processor is performed using the language for recognition.

6. The server according to claim 5, wherein
the parameter that is specified in the request includes conversion information;
the image processing by the image processor includes conversion processing that, by performing conversion processing on the outputted recognized character string using the conversion information that is included in the parameter that was specified in the received request, outputs a converted character string that is converted from the recognized character string; and
the extracted information includes the converted character string.

7. The server according to claim 6, wherein
when the converted character string is extracted, the image processor associates and caches the converted character string with the image ID information, the specified area, the language for recognition, the recognized character string, and the conversion information; and
when the converted character string is cached for the ID information, the specified area, the language for recognition and the conversion information that were specified in the received request, the image processor, instead of the conversion processing, obtains the cached converted character string, and outputs the obtained converted character string.

8. The server according to claim 6, wherein
the conversion processing obtains the converted character string by translating the recognized character string to a translation target language that is specified in the conversion information.

9. The server according to claim 6, further comprising:
an inquiry receiver that receives an inquiry in which the image ID information, a position inside the image and the conversion information are specified, from the terminal; and
an answer transmitter that, when the converted character string that is associated with the ID information that is specified in the received inquiry, the conversion information, and the specified area that includes the position specified in the received inquiry is cached by the image processor, transmits an answer in which the cached converted character string is specified, to the terminal.

10. The server according to claim 2, further comprising:
an inquiry receiver that receives an inquiry in which the image ID information and a position inside the image are specified, from the terminal; and
an answer transmitter that, when the recognized character string that is associated with the ID information that is specified in the received inquiry and a specified area that includes the position that is specified in the received inquiry is cached by the image processor, transmits an answer in which the cached recognized character string is specified, to the terminal.

11. The server according to claim 1, further comprising:
an inquiry receiver that receives an inquiry in which the image ID information is specified, from the terminal; and
an answer transmitter that,
when the extracted information that is associated with the ID information that is specified in the received inquiry is not cached, transmits an answer in which a message is specified that prompts transmission of the request in which the image ID information and the parameter for image processing are specified, to the terminal, and
when the extracted information that is associated with the ID information that is specified in the received inquiry is cached, transmits an answer in which the extracted information is specified, to the terminal.

12. A computer comprising:
a display that displays an image identified by the ID information on a screen and that is capable of communicating with the server according to claim 10;
at least one non-transitory memory operable to store program code; and
at least one processor operable to read the program code and operate as instructed by the program code, the program causing the computer to function as:
a position detector that detects a selection of a position inside the image that is displayed on the screen;
an inquiry transmitter that, when the selection of the position is detected, transmits an inquiry in which the ID information and the selected position are specified, to a server; and
an answer receiver that receives an answer from the server;
the program causing the computer to function such that
the display further displays on the screen the extracted information that is specified in the received answer;
the program causing the computer to function as:
an area detector that detects a selection of an area inside the image that is displayed on the screen;
a setter that prompts setting the parameter for image processing;
a request transmitter that, when the selection of the area is detected, transmits a request in which the ID information, the set parameter, and the selected area are specified, to the server; and
a response receiver that receives a response from the server; and
the program causing the computer to function such that
the display further displays on the screen the extracted information that is specified in the received response.

13. A control method for a server, comprising:
a request receiving step for receiving a request in which image ID information and a parameter for image processing are specified, from a terminal;
an image processing step for acquiring an image based on the ID information that was specified in the received request, and by using the parameter that was specified in the received request to apply the image processing on the acquired image, outputting extracted information that was extracted from inside the image;
a response transmission step for transmitting a response in which the extracted information that was outputted is specified, to the terminal; wherein
the image processing step includes
after the extracted information has been extracted, associating and caching the extracted information with the image ID information and the parameter;

when the extracted information that is associated with the ID information and the parameter that were specified in the received request is cached, instead of acquiring the image and applying the image processing, obtaining the cached extracted information, and outputting the obtained extracted information;

the image processing step includes character recognition; and the extracted information comprises a recognized character string corresponding to the character recognition.

14. A non-transitory recording medium that is readable by a computer and that records a program that causes the computer to function as:

a request receiver that receives a request in which image ID information and a parameter for image processing are specified, from a terminal;

an image processor that acquires an image based on the ID information that was specified in the received request, and by using the parameter that was specified in the received request to apply the image processing on the acquired image, outputs extracted information that was extracted from inside the image; and a response transmitter that transmits a response in which the extracted information that was outputted by the image processor is specified, to the terminal; wherein after the extracted information has been extracted, the image processor associates and caches the extracted information with the image ID information and the parameter;

when the extracted information that is associated with the ID information and the parameter that were specified in the received request is cached, the image processor, instead of acquiring the image and applying the image processing, obtains the cached extracted information, and outputs the obtained extracted information;

the image processing by the image processor includes performing character recognition; and the extracted information comprises a recognized character string corresponding to the character recognition.

\* \* \* \* \*